(12) United States Patent
Sterling

(10) Patent No.: US 12,501,840 B2
(45) Date of Patent: Dec. 16, 2025

(54) SYSTEMS, ARTICLES, AND METHODS FOR A TUNABLE CAPACITOR

(71) Applicant: D-WAVE SYSTEMS INC., Burnaby (CA)

(72) Inventor: George E.G. Sterling, Vancouver (CA)

(73) Assignee: D-WAVE SYSTEMS, Burnaby (CA)

( * ) Notice: Subject to any disclaimer, the term of this patent is extended or adjusted under 35 U.S.C. 154(b) by 393 days.

(21) Appl. No.: 18/038,382

(22) PCT Filed: Nov. 16, 2021

(86) PCT No.: PCT/US2021/059555
§ 371 (c)(1),
(2) Date: May 23, 2023

(87) PCT Pub. No.: WO2022/115278
PCT Pub. Date: Jun. 2, 2022

(65) Prior Publication Data
US 2024/0008372 A1 Jan. 4, 2024

Related U.S. Application Data

(60) Provisional application No. 63/117,851, filed on Nov. 24, 2020.

(51) Int. Cl.
*H10N 60/80* (2023.01)
*G06N 10/40* (2022.01)
(Continued)

(52) U.S. Cl.
CPC ........... *H10N 60/805* (2023.02); *G06N 10/40* (2022.01); *H10D 1/682* (2025.01); *H10D 1/692* (2025.01); *H10N 60/12* (2023.02); *H10N 69/00* (2023.02)

(58) Field of Classification Search
CPC ......... G06N 10/40; H10D 1/692; H10N 69/00
See application file for complete search history.

(56) References Cited

U.S. PATENT DOCUMENTS

| 4,280,095 A | 7/1981 | Hinton |
| 4,370,359 A | 1/1983 | Fetter et al. |

(Continued)

FOREIGN PATENT DOCUMENTS

| CA | 2386426 A1 | 5/2001 |
| CN | 102944855 A | 2/2013 |

(Continued)

OTHER PUBLICATIONS

Kempe et al., "The Complexity of the Local Hamiltonian Problem", arXiv:quant-ph/0406180, Jun. 24, 2004. https://arxiv.org/abs/quant-ph/0406180.

(Continued)

*Primary Examiner* — Matthew L Reames
(74) *Attorney, Agent, or Firm* — Cozen O'Connor

(57) ABSTRACT

In some implementations, a superconducting integrated circuit has a tunable parallel-plate capacitor, and a magnetic field generator operable to apply a magnetic field to the tunable parallel-plate capacitor to tune a capacitance of the tunable parallel-plate capacitor. The tunable parallel-plate capacitor includes a first capacitor plate having a plane, a second capacitor plate having a plane, and a dielectric interposed between the first capacitor plate and the second capacitor plate. The plane of the second capacitor plate is geometrically parallel to the plane of the first capacitor plate. In some implementations, a superconducting integrated circuit has a tunable parallel-plate capacitor, and an electric field generator operable to apply an electric field to the tunable parallel-plate capacitor to tune a capacitance of the tunable parallel-plate capacitor. The tunable parallel-plate (Continued)

capacitor includes a pair of capacitor plates, and a dielectric interposed between the pair of plates.

20 Claims, 10 Drawing Sheets

(51) Int. Cl.
  *H10D 1/68* (2025.01)
  *H10N 60/12* (2023.01)
  *H10N 69/00* (2023.01)

(56) References Cited

U.S. PATENT DOCUMENTS

| | | |
|---|---|---|
| 4,371,796 A | 2/1983 | Takada |
| 4,496,854 A | 1/1985 | Chi et al. |
| 5,095,357 A | 3/1992 | Andoh et al. |
| 5,110,793 A | 5/1992 | De |
| 5,157,466 A | 10/1992 | Char et al. |
| 5,323,344 A | 6/1994 | Katayama et al. |
| 5,465,049 A | 11/1995 | Matsuura et al. |
| 5,523,914 A | 6/1996 | Weck et al. |
| 5,917,322 A | 6/1999 | Gershenfeld et al. |
| 5,962,781 A | 10/1999 | Veryaskin |
| 6,037,649 A | 3/2000 | Liou |
| 6,058,127 A | 5/2000 | Joannopoulos et al. |
| 6,389,197 B1 | 5/2002 | Iltchenko et al. |
| 6,437,413 B1 | 8/2002 | Yamaguchi et al. |
| 6,459,097 B1 | 10/2002 | Zagoskin |
| 6,495,854 B1 | 12/2002 | Newns et al. |
| 6,504,172 B2 | 1/2003 | Zagoskin et al. |
| 6,597,010 B2 | 7/2003 | Eriksson et al. |
| 6,627,915 B1 | 9/2003 | Ustinov et al. |
| 6,627,916 B2 | 9/2003 | Amin et al. |
| 6,753,546 B2 | 6/2004 | Tzalenchuk et al. |
| 6,784,451 B2 | 8/2004 | Amin et al. |
| 6,791,109 B2 | 9/2004 | Tzalenchuk et al. |
| 6,803,599 B2 | 10/2004 | Amin et al. |
| 6,838,694 B2 | 1/2005 | Esteve et al. |
| 6,885,325 B2 | 4/2005 | Omelyanchouk et al. |
| 6,900,454 B2 | 5/2005 | Blais et al. |
| 6,979,836 B2 | 12/2005 | Zagoskin et al. |
| 6,984,846 B2 | 1/2006 | Newns et al. |
| 6,996,504 B2 | 2/2006 | Novotny et al. |
| 7,002,174 B2 | 2/2006 | Il et al. |
| 7,015,499 B1 | 3/2006 | Zagoskin |
| 7,018,852 B2 | 3/2006 | Wu et al. |
| 7,109,593 B2 | 9/2006 | Freedman et al. |
| 7,230,266 B2 | 6/2007 | Hilton et al. |
| 7,253,654 B2 | 8/2007 | Amin |
| 7,277,872 B2 | 10/2007 | Raussendorf et al. |
| 7,307,275 B2 | 12/2007 | Lidar et al. |
| 7,332,738 B2 | 2/2008 | Blais et al. |
| 7,335,909 B2 | 2/2008 | Amin et al. |
| 7,364,923 B2 | 4/2008 | Lidar et al. |
| 7,533,068 B2 | 5/2009 | Maassen et al. |
| 7,605,600 B2 | 10/2009 | Harris |
| 7,613,764 B1 | 11/2009 | Hilton et al. |
| 7,619,437 B2 | 11/2009 | Thom et al. |
| 7,624,088 B2 | 11/2009 | Johnson et al. |
| 7,639,035 B2 | 12/2009 | Berkley |
| 7,800,395 B2 | 9/2010 | Johnson et al. |
| 7,843,209 B2 | 11/2010 | Berkley |
| 7,847,615 B2 | 12/2010 | Yorozu et al. |
| 7,876,248 B2 | 1/2011 | Berkley et al. |
| 7,880,529 B2 | 2/2011 | Amin |
| 7,898,282 B2 | 3/2011 | Harris et al. |
| 8,022,722 B1 | 9/2011 | Pesetski et al. |
| 8,063,657 B2 | 11/2011 | Rose |
| 8,073,808 B2 | 12/2011 | Rose |
| 8,098,179 B2 | 1/2012 | Bunyk et al. |
| 8,102,185 B2 | 1/2012 | Johansson et al. |
| 8,164,082 B2 | 4/2012 | Friesen |
| 8,169,231 B2 | 5/2012 | Berkley |
| 8,174,305 B2 | 5/2012 | Harris |
| 8,190,548 B2 | 5/2012 | Choi |
| 8,190,553 B2 | 5/2012 | Routt |
| 8,195,596 B2 | 6/2012 | Rose et al. |
| 8,234,103 B2 | 7/2012 | Biamonte et al. |
| 8,421,053 B2 | 4/2013 | Bunyk et al. |
| 8,536,566 B2 | 9/2013 | Johansson et al. |
| 8,738,105 B2 | 5/2014 | Berkley et al. |
| 8,854,074 B2 | 10/2014 | Berkley |
| 9,015,215 B2 | 4/2015 | Berkley et al. |
| 9,059,674 B2 | 6/2015 | Chow et al. |
| 9,129,224 B2 | 9/2015 | Lanting et al. |
| 9,178,154 B2 | 11/2015 | Bunyk |
| 9,183,508 B2 | 11/2015 | King |
| 9,471,880 B2 | 10/2016 | Williams |
| 9,495,644 B2 | 11/2016 | Chudak et al. |
| 9,710,758 B2 | 7/2017 | Bunyk et al. |
| 9,806,711 B1 | 10/2017 | Abdo |
| 10,002,107 B2 | 6/2018 | Lanting |
| 10,068,180 B2 | 9/2018 | Amin et al. |
| 10,074,792 B1 | 9/2018 | Ferguson et al. |
| 10,268,622 B2 | 4/2019 | Hilton et al. |
| 10,467,545 B2 | 11/2019 | Harris |
| 10,938,346 B2 | 3/2021 | Berkley et al. |
| 11,348,024 B2 | 5/2022 | Harris et al. |
| 11,494,683 B2 | 11/2022 | Amin et al. |
| 2002/0117656 A1 | 8/2002 | Amin et al. |
| 2002/0190381 A1 | 12/2002 | Herr et al. |
| 2003/0027724 A1 | 2/2003 | Rose et al. |
| 2003/0121028 A1 | 6/2003 | Coury et al. |
| 2003/0224753 A1 | 12/2003 | Bremond et al. |
| 2004/0078421 A1 | 4/2004 | Routt |
| 2004/0140537 A1 | 7/2004 | Il et al. |
| 2005/0062072 A1 | 3/2005 | Yamamoto et al. |
| 2005/0127915 A1 | 6/2005 | Schauwecker et al. |
| 2005/0140019 A1 | 6/2005 | Watanabe |
| 2006/0043541 A1 | 3/2006 | Tetelbaum |
| 2007/0212889 A1 | 9/2007 | Abatchev et al. |
| 2008/0052055 A1 | 2/2008 | Rose et al. |
| 2008/0238531 A1 | 10/2008 | Harris |
| 2009/0070402 A1 | 3/2009 | Rose et al. |
| 2009/0153180 A1 | 6/2009 | Herr |
| 2010/0182039 A1 | 7/2010 | Baumgardner et al. |
| 2014/0229722 A1 | 8/2014 | Harris |
| 2014/0266406 A1 | 9/2014 | Abraham et al. |
| 2014/0345251 A1 | 11/2014 | Mclean et al. |
| 2015/0111754 A1 | 4/2015 | Harris et al. |
| 2016/0267032 A1 | 9/2016 | Rigetti et al. |
| 2017/0047161 A1 | 2/2017 | Ludois et al. |
| 2017/0062692 A1 | 3/2017 | Dial et al. |
| 2017/0193388 A1 | 7/2017 | Filipp et al. |
| 2017/0344898 A1 | 11/2017 | Karimi et al. |
| 2018/0247974 A1 | 8/2018 | Oliver et al. |
| 2019/0019098 A1 | 1/2019 | Przybysz |
| 2019/0019099 A1 | 1/2019 | Hoskinson et al. |
| 2019/0237648 A1 | 8/2019 | Przybysz et al. |
| 2019/0393401 A1 | 12/2019 | Megrant |
| 2021/0013391 A1 | 1/2021 | Johnson et al. |
| 2021/0190885 A1 | 6/2021 | Swenson et al. |

FOREIGN PATENT DOCUMENTS

| | | |
|---|---|---|
| CN | 104462689 A | 3/2015 |
| JP | 2005142348 A | 6/2005 |
| JP | 2007250771 A | 9/2007 |
| JP | 2009065017 A | 3/2009 |
| JP | 2011524043 A | 8/2011 |
| JP | 2011197875 A | 10/2011 |
| JP | 2012064974 A | 3/2012 |
| JP | 6140679 B2 | 5/2017 |
| JP | 2020524064 A | 8/2020 |
| WO | 2004077600 A1 | 9/2004 |
| WO | 2005093649 A1 | 10/2005 |
| WO | 2004079649 A3 | 11/2005 |
| WO | 2006024939 A2 | 3/2006 |
| WO | 2007085074 A1 | 8/2007 |
| WO | 2015103372 A1 | 7/2015 |
| WO | 2022006114 A1 | 1/2022 |
| WO | 2022115278 A1 | 6/2022 |

(56) References Cited

FOREIGN PATENT DOCUMENTS

OTHER PUBLICATIONS

Kerman et al., "Quantum Enhanced Optimization: Experimental Study Overview", IARPA, Oct. 26, 2015.
Kim et al., "Coupling of Josephson Current Qubits Using a Connecting Loop," arXiv:cond-mat/0305127v1, May 7, 2003.
Kim, "Controllable Coupling in Phase-Coupled Flux Qubits," arXiv:cond-mat/0602604v3, Sep. 29, 2006.
Koch et al., "Model for 1/f Flux Noise in SQUIDs and Qubits," arXiv:cond-mat/0702025v2, pp. 1-14, May 5, 2007.
Koval et al., "Narrow Long Josephson Junctions", IEEE, Jun. 1999. https://ieeexplore.ieee.org/document/783894.
Lang, "Analog was not a Computer Trademark!," Sound & Vibration: Aug. 16-24, 2000.
Lanting et al., "Geometrical dependence of the low-frequency noise in superconducting flux qubits", arXiv:0812.0378v1, Dec. 1, 2008.
Lantz et al., "Josephson Junction Qubit Network with Current-Controlled Interaction," Proceedings of the Fourth International Workshop on Macroscopic Quantum Coherence and Computing (MQC2'04), Jun. 7-10, 2004, 13 pages.
Lechner et al., "A quantum annealing architecture with all-to-all connectivity from local interactions", Science Advances. Oct. 23, 2015. https://advances.sciencemag.org/content/1/9/e1500838.
Leggett et al., "Dynamics of the dissipative tWo-state system", Reviews of Modern Physics, 59, pp. 1-85, Jan. 1, 1987.
Leib et al., "A Transmon Quantum Annealer: Decomposing Many-Body Ising Constraints Into Pair Interactions", arXiv:1604.02359v1 [quant-ph], Apr. 8, 2016. https://arxiv.org/abs/1604.02359.
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Lidar, "On the quantum computational complexity of the lsing spin glass partition function and of knot invariants," New Journal of Physics 6(167): 1-15, 2004.
Liu, Qichun et al., "Simulation of Three-dimensional Resonator for Quantum Computation," Cryogenics & Superconductivity, vol. 42, No. 10, pp. 27-31, 2014.
Lykiardopoulou et al., "Improving nonstoquastic quantum annealing with spin-reversal transformations", Arxiv:2010.00065v1, Sep. 30, 2020.
Maasen van den Brink et al., "Mediated Tunable Coupling of Flux Qubits," arXiv:cond-mat/0501148v2, Oct. 13, 2005.
Maassen van den Brink, "Galvanic coupling of flux qubits simple theory and tunability", (cond-mat.supr-con), May 16, 2006. https://arxiv.org/abs/cond-mat/0605398.
Madou, Fundamentals of Microfabrication, Second Edition, CRC Press LLC, Boca Raton, Florida, 2002. (book details provided).
Majer, et al., "Spectroscopy on Two Coupled Superconducting Flux Qubits", arXiv:cond-mat/0308192v1, Aug. 10, 2003.
Majer, J.B., "Superconducting Quantum Circuits," Thesis, published by DUP Science, Dec. 13, 2002, 120 pages.
Makhlin et al., "Quantum-state engineering with Josephson-junction devices," arXIv:cond-mat/0011269v1, arXiv:cond-mat/0011269v1, Nov. 15, 2000.
Marina et al., "Improving nonstoquastic annealing with spin-reversal transformations", arXiv:2010.00065v1, Sep. 30, 2020.
Martinis et al., "Decoherence of a superconducting qubit due to bias noise", Physical Review B, Mar. 25, 2003. https://journals.aps.org/prb/abstract/10.1103/PhysRevB.67.094510.
Martinis et al., "Rabi Oscillations in a Large Josephson-Junction Qubit," Physical Review Letters 89(11):117901-1-117901-4, Sep. 9, 2002.
Martinis, "Superconducting phase qubits," Quantum Inf Process 8:81-103, 2009.
Mooij et al., "Josephson Persistent-Current Qubit," Science 285:1036-1039, Aug. 13, 1999.
Nakamura et al., "Coherent control of macroscopic quantum states in a single-Cooper-pair-box," Nature 398:786-788, Apr. 29, 1999.

Neill, "A path towards quantum supremacy with superconducting qubits", PHD Thesis—University of California, Dec. 1, 2017.
Nielsen et al., "7.8 Other implementation schemes", Quantum Computing and Quantum Information, 2000. http://mmrc.amss.cas.cn/tlb/201702/W020170224608149940643.pdf.
Nielsen et al., "4.5 Universal Quantum Gates", Quantum Computing and Quantum Information, 1st ed. 2000.
Nielsen et al., "7.8 Other implementation schemes," in Quantum Computation and Quantum Information, 1st ed., Cambridge University Press, Cambridge, 2000, pp. 343-345.
Nielsen et al., Quantum Computation and Quantum Information, Cambridge University Press, 10th ed., Cambridge, 2010.
Nishimori et al., "Exponential enhancement of the efficiency of quantum annealing by non-stoquastic hamiltonians", arXiv:1609.03785v3 [quant-ph], Feb. 18, 2017. https://arxiv.org/abs/1609.03785.
Niskanen et al., "Quantum Coherent Tunable Coupling of Superconducting Qubits," Science 316:723-726, May 4, 2007.
Niskanen et al., "Tunable Coupling Scheme for Flux Qubits at the Optimal Point," arXiv:cond-mat/0512238v1, Dec. 12, 2005.
Notice of Allowance for U.S. Appl. No. 17/113,847, mailed Jul. 20, 2023, 11 pages.
Nunn, et al., Quantum Memory in Atomic Ensembles, Doctoral Thesis, Clarendon Laboratory, University of Oxford, 2008, pp. 1-524 (Year:2008).
Oliveria et al., "The complexity of quantum spin systems on a two-dimensional square lattice", arXiv:quant-ph/0504050, v6, Jun. 3, 2008.
Orlando et al., "Superconducting persistent-current qubit," Physical Review B 60(22):15398-15413, Dec. 1, 1999.
Ortlepp et al., "Access Time and Power Dissipation of a Model 256-Bit Single Flux Quantum RAM", IEEE Transactions on Applied Superconductivity, vol. 24, No. 4, Aug. 2014.
Ortlepp et al., "Design Guidelines for Suzuki Stacks as Reliable High-speed Josephson Voltage Drivers", Superconductor Science Technology, 26 (2013) 035007 (12pp).
Paauw, "Spectroscopy Experiments On Two Coupled Josephson Persistent Current Qubits," Thesis Final Report, Delf University of Technology, Nov. 2002.
Pashkin et al., "Quantum Oscillations in Two Coupled Charge Qubits," Nature 421:823-826, Feb. 20, 2003.
Plourde et al., "Entangling Flux Qubits with a Bipolar Dynamic Inductance," Physical Review B 70, arXiv:quant-ph/0406049v1, Jun. 8, 2004, 4 pages.
Quintana, "Superconducting Flux Qubits for High-Connectivity Quantum Annealing Without Lossy Dielectrics," Doctoral Thesis, UC Santa Barbara, 2017, 413 pages. https://escholarship.org/uc/item/9844c3h3.
Ramos et al., "Design for Effective Thermalization of Junctions for Quantum Coherence," IEEE Transactions on Applied Superconductivity 11(1):998-1001, Mar. 2001.
Rocchetto et al., "Stabilisers as a design tool for new forms of Lechner-Hauke-Zoller Annealer", arXiv:1603.08554 [quant-ph], May 2, 2016. https://arxiv.org/abs/1603.08554.
Aaronson, "Thanksgiving Special: D-Wave at MIT," Shtetl-Optimized—The Blog of Scott Aaronson, URL=http://www.scottaaronson.com/blog/?p=291, retrieved Apr. 14, 2011 (originally retrieved Nov. 28, 2007), 54 pages.
Abelson et al., "Superconductor Integrates Circuit Fabrication Technology", IEEE Invited Paper, Oct. 10, 2004. https://ieeexplore.ieee.org/document/1335546.
Albash et al., "Simulated Quantum Annealing with Two All-to-All Connectivity Schemes", arXiv:1603.03755v1 [quant-ph], Mar. 11, 2016. https://arxiv.org/abs/1603.03755.
Al-Saidi et al., "Several small Josephson junctions in a resonant cavity: Deviation from the Dicke model", Physical Review B, Jun. 5, 2002.
Amin et al., "Decoherence in adiabatic quantum computation", arXiv:0708.0384v1, Aug. 2, 2007. https://arxiv.org/abs/0708.0384.
Amin et al., "Probing Noise in Superconducinting Flux Qubits Using Macroscopic Resonant Tunneling" Sep. 1, 2007.

(56) References Cited

OTHER PUBLICATIONS

Angelakis et al., "Many body effects and cluster state quantum computation in strongly interacting systems of photons," arXiv:0803.1665v1. Mar. 11, 2008.
Astafiev et al., "Single-Shot Measurement of the Joseph Charge Qubit," Physical Review B 69(180507(R):1-4, 2004.
Averin et al., "Variable Electrostatic Transformer: Controllable Coupling of Two Charge Qubits," Physical Review Letters 91(5): 057003-1-057003-4, Aug. 1, 2003. arXiv:cond-mat/0304166v1, Apr. 7, 2003.
Averin, D.V., "Adiabatic Quantum Computation with Cooper Pairs," arXiv:quant-ph/9706026v1, Jun. 13, 1997, 18 pages.
Barenco et al., "Elementary gates for quantum computation," Physical Review A 52(5):3457-3467, Nov. 1995.
Barends R. et al., "Coherent Josephson qubit suitable for scalable quantum integrated circuits," arXiv:1304.2322v1 [quant-ph], Apr. 8, 2013, 10 pages.
Bartlett et al., "Simple Nearest-Neighbor Two-Body Hamiltonian System for Which the Ground State is a Universal Resource for Quantum Computation," arXiv:quant-ph/0609002v3 Oct. 24, 2006.
Berggren, "Quantum Computing With Superconductors", Proceedings of the IEEE, vol. 92(10), Oct. 1, 2004. https://www.researchgate.net/publication/2986358_Quantum_Computing_with_Superconductors.
Berkley et al., "Entangled Macroscopic Quantum States in Two Superconducting Qubits", Science, vol. 300, Jun. 6, 2003. https://science.sciencemag.org/content/300/5625/1548.
Biamonte et al., "Realizable Hamiltonians for universal adiabatic quantum computers," arXiv:0704.1287v2, Jun. 17, 2008, 7 pages.
Biamonte et al., "Physical Realizations of a Universal Adiabatic Quantum Computer," Notice of Allowance dated Jun. 18, 2015, for U.S. Appl. No. 13/539,039, 9 pages.
Biamonte et al., "Physical Realizations of a Universal Adiabatic Quantum Computer," Notice of Allowance dated Mar. 28, 2012, for U.S. Appl. No. 12/098,348, 8 pages.
Biamonte et al., "Physical Realizations of a Universal Adiabatic Quantum Computer," Office Action dated Mar. 16, 2012, for U.S. Appl. No. 12/098,348, 6 pages.
Blais et al., Cavity Quantum Electrodynamics for Superconducting Electrical Circuits: An Architecture for Quantum Computation, Physical Review A 69(062320):1-14, 2004.
Blais et al., "Operation of universal gates in a solid-state quantum computer based on clean Josephson junctions between d-wave superconductors", Physical Review A, 61, 042308, 2000.
Blais et al., "Tunable Coupling of Superconducting Qubits," arXiv:cond-mat/0207112v3 [cond-mat.mes-hall], Mar. 18, 2003, 4 pages.
Blais, et al., "Cavity quantum electrodynamics for superconducting electrical circuits" an architecture for quantum computation, arXiv:cond-mat/0402216v1, Feb. 7, 2004, pp. 1-14 (Year:2004).
Blatter et al., "Design aspects of superconducting-phase quantum bits," Physical Review B 63: 174511-1-174511-9, 2001.
Blatter, G., "The Qubit Duet," Nature 421:796-797, Feb. 20, 2003.
Bocko et al., "Prospects for Quantum Coherent Computation Using Superconducting Electronics," IEEE Transactions on Applied Superconductivity 7(2):3638-3641, Jun. 1997.
Bravyi et al., "The Complexity of Stoquastic Local Hamiltonian Problems," arXiv:quant-ph/0606140v1, pp. 1-21, Jun. 16, 2006.
Buisson et al., "Entangled states in a Josephson charge qubit coupled to a superconducting resonator", arXiv.org:cond/mat/0008275v1, Aug. 18, 2000.
Butcher, J.R., "Advances in Persistent-Current Qubit Research: Inductively Coupled Qubits and Novel Biasing Methods," Final Report, Delft University of Technology, Jan. 10, 2002, 52 pages.
Carelli et al., "SQUID Systems for Macroscopic Quantum Coherence and Quantum Computing", IEEE trans. Apple. Supercond., Mar. 1, 2001. https://ieeexplore.ieee.org/document/919321.
Castin et al., "Coherent Atomic Matter Waves: Proceedings of the Les Houches Summer School, Session LXXII in 1999," Springer-Verlag, New York, ISBN 286883499X, pp. 184-188, 294-295, 302-303.

Chancellor et al., "A Direct Mapping of Max k-SAT and High Order Parity Checks to a Chimera Graph", arXiv:1604.00651v1, Apr. 3, 2016.
Chancellor et al., "Circuit design for multi-body interactions in superconducting quantum annealing systems with applications to a scalable architecture", arXiv:1603.09521v5, Oct. 13, 2017.
Chancellor et al., "Experimental Freezing of mid-Evolution Fluctuations with a Programmable Annealer", arXiv:1605.07549 [quant-ph], May 25, 2016. https://arxiv.org/abs/1605.07549.
Chen et al., "Qubit architecture with high coherences and fast tunable coupling", Physical Review Letters, Feb. 28, 2014. https://arxiv.org/abs/1402.7367.
Cheon, et al., "AlN Based RF MEMS Tunable Capacitor with Air-Suspended Electrode with Two Stages", Journal of Semiconductor Technology and Science, vol. 14, No. 1, Feb. 2013, 7 pages.
Chinese Notice of Issuance dated Jun. 6, 2022 for Chinese Application No. 201680058686.7, 4 pages.
Choi, M-S., "Geometric Quantum Computation on Solid-State Qubits," arXiv:quant-ph/0111019v4, Sep. 29, 2003, 7 pages.
Clarke et al., "Superconducting quantum bits," Nature 453:1031-1042, Jun. 19, 2008.
Corato et al., "Adiabatic Quantum Computation with Flux Qbits," Quantum Computing in Solid State Systems, ch 13, pp. 103-110, 2006.
Cormen et al., Introduction to Algorithms, The MIT Press, Cambridge, Massachusetts, pp. 964-985, 2000.
Cosmelli, C., "Controllable Flux Coupling for the Integration of Flux Qubits," arXiv:cond-mat/0403690v1 [cond-mat.supr-con]. Mar. 29, 2004, 10 pages.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
Born , et al., Born et al., "Fabrication of Ultrasmall Tunnel Junctions by Electron Beam Direct-Writing", IEEE, 11(1) Mar. 2001, 4 pages.
Rudo, "Influence of strong noise on the Adiabatic Quantum Computer," University of Vienna, 2015, pp. 1-66.
Sandberg et al., "Tuning the field in a microwave resonator faster than the photon lifetime", Applied Physics Letters, American Institute of Physics, vol. 92, No. 20, 3 pages, May 19, 2008.
Schaller et al., "The role of symmetries in adiabatic quantum algorithms", arXiv:0708.1882v1, Aug. 14, 2007. https://arxiv.org/pdf/0708.1882v1.pdf.
Schützhold et al., "Adiabatic quantum algorithms and quantum phase transitions", arXiv:quant-ph/0608017, Aug. 1, 2006. https://arxiv.org/abs/quant-ph/0608017.
Shnirman et al., "Low-and High-Frequency Noise from Coherent two-Level Systems", arXiv:cond-mat/0412668v2, Jan. 13, 2005.
Shor, "Introduction to Quantum Algorithms," AT&T Labs—Research, arXiv:quant-ph/0005003 v2, pp. 1-17, Jul. 6, 2001.
Steffen et al., "Quantum computing: An IBM perspective", IBM Journal of Research and Development, vol. 55, No. 5, Sep./Oct. 2011.
Steffen, A prototype Quantum Computer Using Nuclear Spins in Liquid Solution, Doctoral Thesis, Stanford University, Jun. 2003 pp. 1-370 (Year: 2003).
Strauch, Theory of Superconducting Phase Qubits, UMI Microform, Ann Arbor, Michigan, 2005, Chapter 8, "Conclusion," pp. 298-306.
Suzuki et al., "Quantum Annealing of the Random-Field Ising Model Transverse Ferromagnetic Interactions," arXiv:quant-ph/0702214v1, 6 pages, Feb. 23, 2007.
Tang et al., "2D implementation of quantum annealing algorisms for fourth order binary optimization problems", Institute for Quantum Computing and Department of Electrical and Computer Engineering, arXiv:1605.03887, May 12, 2016.
Tokuda, "Analog Computation Using Single-Electron Circuits", Analog Integrated Circuits and Signal Processing, Oct. 1, 2000. http://lalsie.ist.hokudai.ac.jp/publication/dlcenter.php?fn=paper/aicsp_2000_tokuda.pdf.
Vala et al., "Encoded Universality for Generalized Anisotropic Exchange Hamiltonians," arXiv:quant-ph/0204016v1, Apr. 4, 2002, 15 pages.

(56) References Cited

OTHER PUBLICATIONS

Van Dam, "Quantum Computing: In the 'Death Zone'?," Nature Physics 3:220-221, Apr. 2007.
Van der Ploeg et al., "Controllable Coupling of Superconducting Flux Qubits," arXiv: cond-mat/0605588v1, May 24, 2006.
Van der Ploeg, et al., "Adiabatic Quantum Computation with Flux Qubits, First Experimental Results," arXiv:cond-mat/0702580v1 [cond-mat.supr-con], Feb. 25, 2007, 6 pages.
Van der Wal et al., "Controlled Single-Cooper-Pair Charging Effects in a Small Josephson Junction Array," Journal of Superconductivity, vol. 12, No. 6, 1999. https://www.researchgate.net/profile/Caspar-Wal/publication/225246694_Controlled_Single-Cooper.
Van der Wal et al., "Quantum Superposition of Macroscopic Persistent current states", Science 290, pp. 773-777, 2000.
Van der Wal, C.H., "Quantum Superpositions of Persistent Josephson Currents," Thesis, Published by DUP Science, Sep. 24, 2001, 121 pages.
Vinci et al., "Non-stoquastic interactions in quantum annealing via the aharonov-anandan phase", arXiv:1701.07494v1 [quant-ph], Jan. 25, 2017.
Vion et al., "Manipulating the quantum state of an electrical circuit", Science, 296, pp. 886-889 (2002).
Wallquist et al., "Superconducting Qubit Network with Controllable Nearest-Neighbor Coupling," New Journal of Physics 7(178), 24 pages, 2005. https://iopscience.iop.org/article/10.1088/1367-2630/7/1/178/pdf.
Wallraff et al., "Strong Coupling of a Single Photon to a Superconducting Qubit Using Circuit Quantum Electrodynamics," Nature 431:162-167, Sep. 9, 2004.
Wallraff, "Fluxon dynamics in annular Josephson junctions: from relativistic strings to quantum particles", Friedrich-Alexander University of Erlangen-Nürnberg, Ph.D. Thesis, Apr. 1, 2001.
Wang et al., "Fast Entanglement of Two Charge-Phase Qubits Through Nonadiabatic Couling to a Large Josephson Junction," Physical Review B 70:224515-1-224515-4, 2004. http://site.gscaep.ac.cn/ftp/cpsun/papers/PR/PRB04.pdf.
Watanabe et al., "Resonance-Free Low-Pass Filters for the AC Josephson Voltage Standard," IEEE Transactions on Applied Superconductivity 16(1):49-53, Mar. 2006.
Weber et al., "Coherent Coupled Qubits for Quantum Annealing," arXiv:1701.06544v2 [quant-ph], Jun. 6, 2017, 14 pages.
Wei et al., "Preparation of multi-qubit W states in multiple resonators coupled by a superconducting qubit via adiabatic passage", Quantum Inf Process, Apr. 14, 2015.
Wei et al., "Quantum Computation with Josephson-Qubits by Using a Current-Biased Information Bus," arXiv:cond-mat/0407667 v1, pp. 1-13, Jul. 26, 2004.
Wendin et al., "Superconducting Quantum Circuits, Qubits and Computing," arXiv:cond-mat/0508729v1 [cond-mat.supr-con], Aug. 30, 2005, 60 pages.
Wocjan et al., "Treating the Independent Set Problem by 2D Ising Interactions with Adiabatic Quantum Computing," arXiv:quant-ph/0302027v1, pp. 1-13, Feb. 4, 2003.
Wu et al., "Dressed Qubits," Physical Review Letters 91(9):1-4, Aug. 29, 2003.
Wu et al., "Qubits as Parafermions," arXiv:quant-ph/0109078v3, May 28, 2002, 17 pages.
Wu et al., "Universal Quantum Logic from Zeeman and Anisotropic Exchange Interactions," Physical Review A 66(062314):1-5, 2002.
Yamamoto et al., "Demonstration of conditional gate operation using superconducting charge qubits", Nature, vol. 425, Oct. 30, 2003. https://www.nature.com/articles/nature02015.
Yan et al., "A tunable coupling scheme for implementing high-fidelity two-qubit gates", Arxiv:1803.09813v1, Mar. 26, 2018.
You et al., "Controllable Manipulation and Entanglement of Macroscopic Quantum States in Coupled Charge Qubits," arXiv:cond-mat/0306363v1, Jun. 13, 2003.
You et al., "Scalable Quantum Computing with Josephson Charge Qubits," arXiv:cond-mat/0306209v1, Jun. 2, 2003.
You, et al., "Fast Two-Bit Operations in Inductively Coupled Flux Qubits," arXiv:cond-mat/0309491v3, pp. 1-10, Feb. 5, 2005.
Zagoskin et al., "Quantum Two-Level Systems in Josephson Junctions as Naturally Formed Qubits," arXiv:cond-mat/0603753v3, Aug. 18, 2006.
Zagoskin et al., "Superconducting Qubits," arXiv:0805.0164v1, May 1, 2008.
Zurek, "Decoherence and the transition from quantum to classical", Physics Today, 44, 10, pp. 36-44, 1991.
DiVincenzo, "The Physical Implementation of Quantum Computation," arXiv:quanti-ph/0002077v3, Apr. 13, 2000.
Dolan, "Offset masks for lift-off photoprocessing", Applied Physics Letters, vol. 31(5), Sep. 1, 1977. https://aip.scitation.org/doi/10.1063/1.89690.
Duty et al., "Coherent Dynamics of a Josephson Charge Qubit," Physical Review B 69(140503(R)):1-4, 2004.
Esteve et al., "Solid State Quantum Bit Circuits," arXiv:cond-mat/0505676 [cond-mat.supr-con], May 27, 2005, 37 pages.
European Search Report, mailed Nov. 18, 2010, for EP 08733736.6, 12 pages.
European Search Report, mailed Oct. 13, 2010, for EP 05849198.6, 10 pages.
Extended European Search Report, dated Apr. 4, 2022, for European Application No. 21198672.4, 10 pages.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7): 467-488, 1982.
Foxen et al., "Demonstrating a Continuous Set of Two-Qubit Gates for Near-Term Quantum Algorithms" Physical Review Letters 125, 120504 (2020), 6 pages.
Friedman et al., "Aharonov-Casher-Effect Suppression of Macroscopic Tunneling of Magnetic Flux," arXiv:cond-mat/0109544v1 [cond-mat.mes-hall], Sep. 28, 2001, 9 pages.
Friedman et al., "Detection of a Schrodinger's Cat State in an rf-SQUID," arXiv:cond-mat/0004293v2 2:1-7, Apr. 19, 2000.
Friedman et al., "Quantum superposition of distinct macroscopic states," Nature 406:43-46, Jul. 6, 2000.
Grajcar et al., "Experimental Realization of Direct Josephson Coupling Between Superconducting Flux Qubits," arXiv:cond-mat/0501085v1, Jan. 5, 2005, 4 pages.
Grajcar et al., "Four-Qubit Device with Mixed Couplings", Physical Review Letters, Feb. 3, 2006. https://journals.aps.org/prl/abstract/10.1103/PhysRevLett.96.047006.
Grajcar et al., "Possible Implementation of Adiabatic Quantum Algorithm with Superconducting Flux Qubits," arXiv:cond-mat/0407405v3 [cond-mat.supr-con], Mar. 29, 2005, 8 pages.
Groszkowski et al., "Tunable coupling between three qubits as a building block for a superconducting quantum computer", arXiv:1102.0307v2 [quant-ph], Oct. 20, 2011. https://arxiv.org/abs/1102.0307.
Gu et al., "Encoding Universal Computation in the Ground States of Ising Lattices", arXiv:1204.1084v2 [cond-mast.stat-mech], Jul. 17, 2012. https://arxiv.org/abs/1204.1084.
Han et al., "Time-Resolved Measurement of Dissipation-Induced Decoherence in a Josephson Junction," Science 293:1457-1459, Aug. 24, 2001.
Harrabi, et al. "Engineered selection rules for tunable coupling in a superconducting quantum circuit", Physical Reviews B 79, 020507(r) (2009), 4 pages.
Harris et al., "A Compound Josephson Junction Coupler for Flux Qubits with Minimal Crosstalk," arXiv:0904.3784v1 [cond-mat.supr-con] Apr. 24, 2009, 4 pages.
Harris et al., "Probing Noise in Flux Qubits via Macroscopic Resonant Tunneling", arXiv:0712.0838v2 [cond-mat.mes-hall], Feb. 8, 2008, pp. 1-4.
Harris et al., "Sign and Magnitude Tunable Coupler for Superconducting Flux Qubits," arXiv:cond-mat/0608253v3 [cond-mat.supr-con], Jul. 5, 2007. 5 pages.
Harris et al., "Synchronization of Multiple Coupled rf-SQUID Flux Qubits", arXiv:0903.1884v1, Mar. 11, 2009. https://arxiv.org/abs/0903.1884.

(56) References Cited

OTHER PUBLICATIONS

Harris et al., 'A Compound Josephson Junction Coupler for Flux Qubits With Minimal Crosstalk', arXiv:0904.3784v3, Jul. 2009.
Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
He et al., "Generating multipartite entangled states of qubits distributed in different cavities", Quantum Informatoin Processing, vol. 13, No. 6, pp. 1381-1395 Feb. 11, 2014.
He et al., "Switchable Coupling Between Charge and Flux Qubits," arXiv:cond-mat/0703012v2 [cond-mat.supr-con], 5 pages, 2007.
Hime et al., "Solid-State Qubits with Current-Controlled Coupling," Science 314:1427-1429, 2006.
Hime et al., "Supporting Online Material for Solid-State Qubits with Current-Controlled Coupling," retrieved from http://www.sciencemag.org/cgi/content/full/314/5804/1427/DC1, 5 pages, Dec. 1, 2006.
Hita-Perez et al., "Ultrastrong capacitive coupling of flux qubits", arXiv:2108.02549v1, Aug. 5, 2021. https://arxiv.org/abs/2108.02549.
Hormozi et al., "Nonstoquastic Hamiltonians and Quantum Annealing of an Ising Spin Glass," arXiv:1609.06558v2 [quant-ph], May 15, 2017, 9 pages.
Hu et al., "Decoherence and dephasing in spin-based solid state quantum computers", arXiv.org:cond-mat/0108339v2, Sep. 6, 2001, (2001).
Hua et al., "Microstrip Bandpass Filters Using Dual-Mode Resonators with Internal Coupled Lines," Progress in Electromagnetics Research C, 21:99-111, 2011.
Hutter et al., "Parafermions in a Kagome lattice of qubits for topological quantum computation", arXiv:1505.01412v1, May 6, 2015.
Hutter et al., "Tunable Coupling of qubits: nonadiabatic corrections", arXiv:cond-mat/0602086v2, May 12, 2006. https://arxiv.org/abs/cond-mat/0602086.
Il'ichev et al., "Continuous Monitoring of Rabi Oscillations in a Josephson Flux Qubit," arXiv:cond-mat/0303433v1, Mar. 20, 2003.
Il'ichev et al., "Radio-Frequency Method for Investigation of Quantum Properties of Superconducting Structures," arXiv:cond-mat/0402559v3, Jun. 23, 2004, 10 pages.
Inokuchi et al., "Analog computation using quantum-flux parametron devices," Physica C 357-360 :1618-1621, 2001.
International Search Report and Written Opinion for PCT/US2018/066613, mailed Mar. 29, 2019, 24 pages.
International Search Report and Written Opinion for PCT/US2022/081507 dated Apr. 24, 2023, 12 pages.
Ithier, "manipulation, readout and analysis of the decoherence of a superconducting quantum bit, Doctoral Thesis," Universite's Paris VI, Feb. 12, 2007, pp. 1-0202 (year:2007).
Jiang, "Superconduccting Microelectroincs Device—Merit Units for VLSI", Cryogenics & Superconductivity, vol. 4, pp. 27-34, 1982.
Johansson et al., "Landau-Zener Transitions in an Adiabatic Quantum Computer", arXiv:0807.0797v1, Jul. 4, 2008. https://arxiv.org/abs/0807.0797.
Johnson et al., "Scalable Control System for a Superconducting Adiabatic Quantum Optimization Processor," arXiv:0907.3757v1. Jul. 22, 2009. [online] Available. chrome-extension://efaidnbmnnnibpcajpcglclefindmkaj/https://arxiv.org/pdf/0907.3757v1.pdf.
Joyez et al., "Observation of Parity-Induced Suppression of Josephson Tunneling in the Superconducting Single Electron Transistor", Physical Review Letters, 72(15)12458 2461, (1994).
Kaminsky et al., "Scalable Superconducting Architecture for Adiabatic Quantum Computation," arXiv:quant-ph/0403090v1, Mar. 11, 2004, 5 pages.

SYSTEMS, ARTICLES, AND METHODS FOR A TUNABLE CAPACITOR

TECHNICAL FIELD

This disclosure generally relates to systems, articles and methods for a tunable capacitor, and, more specifically, to systems, articles, and methods for a tunable parallel-plate capacitor in a superconducting integrated circuit, for example, a superconducting quantum processor.

BACKGROUND

Superconductivity

Superconductivity is a set of physical properties observed in a material where electrical resistance of the material vanishes and magnetic flux fields are expelled from the material. A material exhibiting these properties is referred to in the present application as a superconductor. A material exhibiting these properties is also referred to in the present application as a superconducting material. A superconductor typically has a characteristic critical temperature below which its electrical resistance drops to zero. An electric current in a loop of superconducting material can persist indefinitely with no power source.

Superconducting Integrated Circuit

An integrated circuit (also referred to as a chip) is a set of electronic circuits on a small flat piece (or "chip") of substrate. The substrate may include, or consist of, silicon. Non-superconducting integrated circuits can be built using, for example complementary metal-oxide-semiconductor (CMOS) technology. Superconducting integrated circuits can be built using a superconducting material, for example, a superconducting metal such as niobium.

Quantum Processor

Quantum computations may be performed using a quantum processor, for example, a superconducting quantum processor. A superconducting quantum processor may comprise a superconducting integrated circuit including a number of qubits, coupling devices providing communicative coupling between qubits, and flux storage devices. A superconducting quantum processor may include a capacitor, for example, a parallel-plate capacitor.

Further details on systems and methods of exemplary superconducting quantum processors are described in U.S. Pat. Nos. 7,135,701; 7,418,283; 7,533,068; 7,619,437; 7,639,035; 7,898,282; 8,008,942; 8,190,548; 8,195,596; 8,283,943; and US Patent Application Publication 2011-0022820, each of which is incorporated herein by reference in its entirety.

Parallel-Plate Capacitor

Capacitors can be basic building blocks for superconducting integrated circuits. In one example, capacitors can be components of high-bandwidth transmission lines. In another example, capacitors can be components of resonators (e.g., superconducting resonators) used in integrated circuits operable to perform frequency-multiplexed resonant input/output to a superconducting device. In yet another example, capacitors can be used in coupling devices to provide capacitive communicative coupling between superconducting devices in a superconducting integrated circuit.

One type of capacitor is a parallel-plate capacitor, in which a dielectric is sandwiched between two capacitor plates. The two plates can be conductive or superconductive, and can be geometrically at least approximately parallel to each other. The capacitance C of a parallel plate capacitor can be expressed as:

$$c = \frac{\epsilon A}{d}$$

where $\epsilon$ is the permittivity of the dielectric separating the plates, A is the area of one of the plates and d is the thickness of the dielectric. The permittivity is a measure of an electric polarizability of the dielectric.

A superconducting parallel plate thin-film capacitor can be integrated in a heterogeneous multi-layer planarized fabrication stack with deposited dielectrics. See for example PCT Patent Application No. WO2016US31885 (published as International patent application publication WO2016183213A1) entitled "FREQUENCY MULTIPLEXED RESONATOR INPUT AND/OR OUTPUT FOR A SUPERCONDUCTING DEVICE".

BRIEF SUMMARY

A superconducting integrated circuit may be summarized as comprising a) a tunable parallel-plate capacitor, the tunable parallel-plate capacitor comprising a first capacitor plate having a plane, a second capacitor plate having a plane, the plane of the second capacitor plate geometrically parallel to the plane of the first capacitor plate, and a dielectric interposed between the first capacitor plate and the second capacitor plate, and b) a magnetic field generator operable to apply a magnetic field to the tunable parallel-plate capacitor to tune a capacitance of the tunable parallel-plate capacitor.

In some implementations, the magnetic field generator comprises a loop of superconducting material overlying the first capacitor plate and the second capacitor plate, a plane of the loop of superconducting material geometrically parallel to the plane of the first capacitor plate and the plane of the second capacitor plate, wherein, in operation, the loop of superconducting material is driven by a current to generate a magnetic field, the magnetic field which tunes a capacitance of the tunable parallel-plate capacitor. In some implementations, the superconducting integrated circuit further comprises an interface which, in operation, applies a flux bias to the loop of superconducting material to cause magnetic flux to be introduced into the loop.

In some implementations, each of the first capacitor plate and the second capacitor plate comprise a superconducting material. The superconducting material may be a superconducting metal. The superconducting metal may be at least one of niobium and aluminum. The superconducting material may include a material having a high penetration depth. The material having a high penetration depth may be one of titanium nitride (TiN), niobium titanium nitride (NbTiN), niobium nitride (NbN), and tungsten silicide (WSi).

In some implementations, the dielectric includes a layer of low-loss dielectric. The low-loss dielectric may be at least one of amorphous silicon, crystalline silicon, silicon dioxide, silicon nitride, or amorphous silicon hydride.

In some implementations, the superconducting integrated circuit further comprises a base electrode electrically communicatively coupled to the first capacitor plate, and a counter electrode electrically communicatively coupled to the second capacitor plate.

A superconducting integrated circuit may be summarized as comprising a) a tunable parallel-plate capacitor, the tunable parallel-plate capacitor comprising a first capacitor plate having a plane, a second capacitor plate having a plane, the plane of the second capacitor plate geometrically parallel to the plane of the first capacitor plate, and a dielectric interposed between the first capacitor plate and the second capacitor plate, and b) means for applying a magnetic field to the tunable parallel-plate capacitor to tune a capacitance of the tunable parallel-plate capacitor.

A superconducting integrated circuit may be summarized as comprising a) a tunable parallel-plate capacitor, the tunable parallel-plate capacitor comprising a first capacitor plate having a plane, a second capacitor plate having a plane, the plane of the second capacitor plate geometrically parallel to the plane of the first capacitor plate, the second capacitor plate spaced apart from the first capacitor plate, and a dielectric interposed between the first capacitor plate and the second capacitor plate, and b) an electric field generator operable to apply an electric field to the tunable parallel-plate capacitor to tune a capacitance of the tunable parallel-plate capacitor.

In some implementations, the electric field generator comprises a first bias electrode having a plane, and a second bias electrode having a plane, the plane of the second bias electrode geometrically parallel to the plane of the first bias electrode, the planes of the first and the second bias electrodes orthogonal to the planes of the first and the second capacitor plates, the first and the second bias electrodes situated between the first and the second capacitor plates, and on either side of the dielectric, wherein, in operation, the first and the second bias electrodes provide a bias current to generate an electric field, the electric field which tunes a capacitance of the tunable parallel-plate capacitor. The bias current may include a direct current (DC) bias current. The bias current may include an alternating (AC) bias current.

In some implementations, the electric field generator comprises an interdigitated capacitor interposed between the first and the second capacitor plates.

In some implementations, the electric field reduces a capacitance of the tunable parallel-plate capacitor. The electric field may monotonically reduce a capacitance of the tunable parallel-plate capacitor.

In some implementations, each of the first capacitor plate and the second capacitor plate comprise a superconducting material. The superconducting material may be a superconducting metal. The superconducting metal may be at least one of niobium and aluminum. The superconducting material may include a material having a high penetration depth. The material having a high penetration depth may be one of titanium nitride (TiN), niobium nitride (NbN), niobium titanium nitride (NbTiN), and tungsten silicide (WSi).

In some implementations, the dielectric includes a layer of low-loss dielectric. The low-loss dielectric may at least one of amorphous silicon, crystalline silicon, silicon dioxide, silicon nitride, or amorphous silicon hydride.

In some implementations, the superconducting integrated circuit further comprises a base electrode electrically communicatively coupled to the first capacitor plate, and a counter electrode electrically communicatively coupled to the second capacitor plate.

A superconducting integrated circuit may be summarized as comprising a) a tunable parallel-plate capacitor, the tunable parallel-plate capacitor comprising a first capacitor plate having a plane, a second capacitor plate having a plane, the plane of the second capacitor plate geometrically parallel to the plane of the first capacitor plate, and a dielectric interposed between the first capacitor plate and the second capacitor plate, and b) means for applying an electric field to the tunable parallel-plate capacitor to tune a capacitance of the tunable parallel-plate capacitor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION

Preamble

Figure 1:
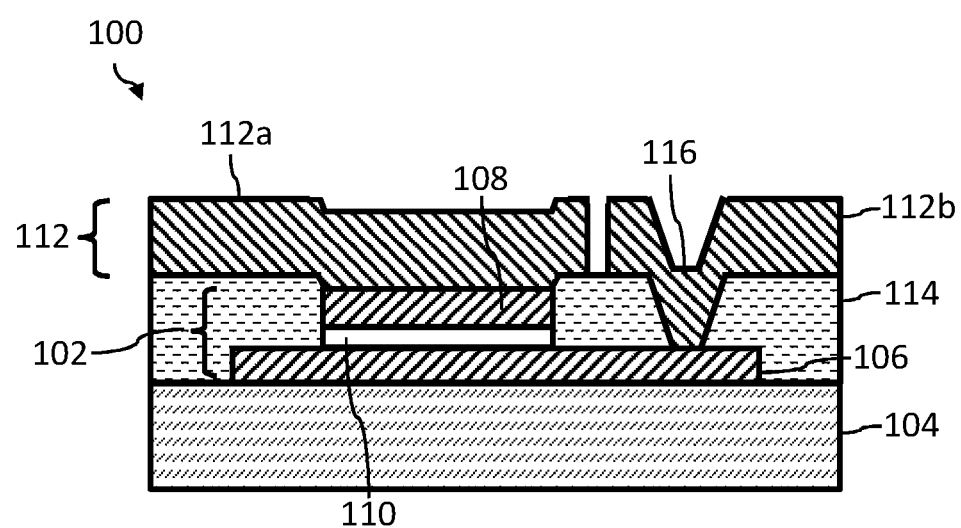
FIG. 1 is a cross-sectional diagram illustrating an example implementation of a fabrication stack of a superconducting integrated circuit, according to the present disclosure.

In the following description, some specific details are included to provide a thorough understanding of various disclosed implementations and embodiments. One skilled in the relevant art, however, will recognize that embodiments may be practiced without one or more of these specific details, or with other methods, components, materials, etc. In other instances, well-known structures associated with superconductive devices and integrated superconductive circuits have not been shown or described in detail to avoid unnecessarily obscuring descriptions of the implementations or embodiments of the present methods. Throughout this specification and the appended claims, the words "element" and "elements" are used to encompass, but are not limited to, all such structures, systems, and devices associated with superconductive circuits and integrated superconductive circuits.

Unless the context requires otherwise, throughout the specification and claims which follow, the word "comprise" is synonymous with "including," and is inclusive or open-ended (i.e., does not exclude additional, unrecited elements or acts).

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a readout system including "a superconducting resonator" includes a single superconducting resonator, or two or more superconducting resonators. It should also be noted that the term "or" is generally employed in its sense including "and/or" unless the content clearly dictates otherwise.

The headings provided herein are for convenience only and do not interpret the scope or meaning of the embodiments.

High-Bandwidth Transmission Lines

High-bandwidth transmission lines can be used for communicating with a processor, for example, a superconducting processor. High-bandwidth transmission lines can be microwave transmission lines, for example. It can be desirable for the impedance of a transmission line to be son, for example, to match an impedance of a device that is communicatively coupled to the transmission line. It can be desirable to tune a capacitance of a parallel-plate capacitor to cause an impedance of the transmission line to at least approach a value of son, for example.

Superconducting Resonators

When high-bandwidth lines are available for communicating with the processor, more efficient use of the bandwidth can be made by coupling the high-bandwidth line to a suitable on-chip element. An example on-chip element suitable for coupling to a high-bandwidth transmission line is a superconducting resonator. An array of resonators can be coupled to a single transmission line using frequency-domain multiplexing by tuning a resonant frequency of each resonator. The resonant frequency can be tuned, for example, by adjusting a length of the resonator, and/or by adding additional capacitance. In one implementation, the resonator is a half-wave superconducting resonator. Microwave current can be excited when the resonator is driven near its resonant frequency. Addressing can be achieved by selectively transmitting a set of tones corresponding to a set of resonators in the array of resonators.

One implementation of a superconducting resonator is a distributed superconducting resonator. An example of a distributed superconducting resonator is half-wavelength ($\lambda/2$) resonator. Another implementation of a superconducting resonator is a lumped-element resonator.

A superconducting resonator may include one or more capacitors which may be parallel-plate capacitors. It can be desirable to tune a capacitance of a parallel-plate capacitor in a superconducting resonator, for example.

Capacitive Coupling Between Superconducting Devices

A coupling device providing communicative coupling between superconducting devices may include a capacitor which may be a parallel-plate capacitor. The capacitor can provide capacitive coupling between the devices, for example, and may be used to implement a non-stoquastic Hamiltonian on the superconducting quantum processor. It can be desirable to tune a capacitance of a parallel-plate capacitor in a capacitive coupling device, for example, to adjust a coupling strength of the coupling device.

Tunable Capacitors

Tunable capacitors are also referred to in the present application as variable capacitors. In electronics, a varicap is a type of diode designed to exploit a voltage-dependent capacitance of a reverse-biased p-n junction. A p-n junction is an interface between p-type and n-type semiconductor materials, inside a single crystal of semiconductor. A varicap can be operated in a reverse-biased state, such that no direct current (DC) flows through the device. The reverse bias can be adjusted to control a thickness of a depletion zone in the p-n junction, and consequently a capacitance of the varicap. A varicap is generally unsuitable for superconducting integrated circuits operating at cryogenic temperatures. Semiconductor materials can become unreliable conductors at cryogenic temperatures. Moreover, semiconductors materials can be dissipative and, in operation, can generate unwanted heat.

Microelectromechanical systems (MEMS) can use flexure devices in combination with electrostatic attraction or repulsion to vary a distance between charge-carrying plates. In an example implementation, a MEMS-based digital variable capacitor includes a multi-cantilever with variable length, suspended over a bottom electrode. Applying a voltage between the electrodes of the capacitor can cause an electrostatic force to pull-in the cantilevers one-by-one, thereby increasing the capacitance. It would be a challenge to integrate MEMS with a fabrication stack of a superconducting integrated circuit. Moreover, MEMS can be sensitive to pressure changes, and may not survive a thermal cycling between room temperature and a cryogenic temperature.

In another approach, an inverse piezoelectric effect can be used to expand or shrink piezoelectric material by applying a voltage, thereby increasing or decreasing a distance between charge-carrying plates, electrodes, or interdigitated features of a capacitor.

In yet another approach, magnetostriction (a property of magnetic materials to change their dimensions during magnetization) can be used to vary a separation distance between plates, electrodes, or interdigitated features of a capacitor. Both the inverse piezoelectric effect and magnetostriction store and release mechanical energy, and are dissipative.

Parallel-Plate Capacitor in a Superconducting Integrated Circuit

One method of fabricating a superconducting parallel plate capacitor may be summarized as including: depositing a first superconductive layer, the first superconductive layer comprising a material that is superconductive in a range of critical temperatures; depositing a first dielectric layer to overlie at least part of the first superconductive layer; depositing a second superconductive layer to overlie at least part of the dielectric layer, the second superconductive layer comprising a material that is superconductive in the range of critical temperatures; removing a portion of the second superconductive layer to form at least one structure from the second superconductive layer and to expose at least part of the first dielectric layer; depositing a second dielectric layer to overlie at least part of the second superconductive layer and at least part of the first dielectric layer; planarizing the second dielectric layer; removing at least part of the second dielectric layer to form a first via exposing at least part of the second superconductive layer; removing at least part of the second dielectric layer and at least part of the first dielectric layer to form a second via exposing at least part of the first superconductive layer; depositing a first region of a third superconductive layer; and depositing a second region of the third superconductive layer, wherein the first region of the third superconductive layer is electrically isolated from the second region of the third superconductive layer, the first region of the third superconductive layer is superconductingly connected to at least part of the second superconductive layer by way of the first via, and the second region of the third superconductive layer is superconductingly connected to at least part of the first superconductive layer by way of the second via.

The first and the second superconductive layers may include niobium. The first dielectric layer may include silicon nitride. The second dielectric layer may include silicon dioxide. The third superconductive layer may include niobium. The thickness of the first and the second superconductive layers may be in the range of about 100 nm to 400 nm, the thickness of the first dielectric layer may be in the range of about 10 nm to 100 nm, and the thickness of the second dielectric layer may be in the range of about 100 nm to 300 nm.

In another method, a parallel-plate capacitor is formed between a base electrode and a counter electrode, the parallel-plate capacitor including, or consisting of, a lower capacitor plate electrically communicatively coupled to the base electrode, and an upper capacitor plate electrically communicatively coupled to the counter electrode.

In one implementation, a superconducting integrated circuit includes a substrate with a base electrode overlying at least a portion of the substrate. The base electrode may be superconductive. A parallel-plate capacitor may overlie at least a portion of the base electrode. The parallel-plate capacitor may have a superconductive lower capacitor plate with a metal-oxide layer overlying the plate, and a superconductive upper capacitor plate overlying the metal-oxide layer. The base electrode may be superconductingly electrically coupled to the lower capacitor plate. A counter electrode may overlie at least a portion of the upper capacitor plate. The counter electrode may be superconductive, and the counter electrode may be superconductingly electrically coupled to the upper capacitor plate.

The footprint of a parallel plate capacitor can be proportional to a ratio of the thickness of the dielectric to the relative permittivity of the dielectric. In practice, there can be restrictions on the how high the relative permittivity of the dielectric can be, and how thin the dielectric can be fabricated. Conventionally, the relative permittivity of the dielectric is typically less than approximately 10, and the thickness of the dielectric is typically greater than approximately 50 nm.

An advantage of using a metal oxide layer is that the metal oxide layer can be very thin, for example only a few nm (nanometers). Another advantage is that the relative permittivity of the metal-oxide layer can be as high or higher than the relative permittivity of an amorphous inter-layer dielectric. For example, the relative permittivity of niobium oxide is approximately 40, and the relative permittivity of aluminum oxide is approximately 10, whereas the relative permittivity of silicon dioxide is approximately 4.

In one implementation, the lower capacitor plate includes a third superconducting metal layer that overlies the second superconducting metal layer and is superconducting in a range of temperatures. In one implementation, the third superconducting metal layer includes aluminum. In one implementation, the thickness of the third superconducting metal layer is at least an order of magnitude thinner than the thickness of the second superconducting metal layer. In the present application, an order of magnitude of a number is the smallest integer power of 10 that can be used to represent the number. In one implementation, the third superconducting metal layer has a thickness of approximately 8 nm.

Flux-Tunable Parallel-Plate Capacitor

FIG. 1 is a cross-sectional diagram illustrating an example implementation of a fabrication stack 100 of a portion of a superconducting integrated circuit, according to the present disclosure. Fabrication stack 100 includes a parallel-plate capacitor 102 overlying a substrate 104.

Parallel-plate capacitor 102 comprises a capacitor plate 106. Capacitor plate 106 may be at least part of a superconducting wiring layer. Capacitor plate 106 may include, or consist of, a superconducting metal, e.g., niobium or aluminum. Substrate 104 may include, or consist of, silicon.

Parallel-plate capacitor comprises a capacitor plate 108, and an interposed dielectric 110. Capacitor plate 108 may be at least part of a superconducting wiring layer. Capacitor plate 108 may include, or consist of, a superconducting metal, e.g., niobium or aluminum.

In some implementations, dielectric 110 includes, or consists of, at least one of silicon dioxide and silicon nitride. Decreasing a thickness of dielectric 110, when it is formed or deposited, can increase a Q factor of parallel-plate capacitor 102. The Q factor is also referred to in the present application as the quality factor, or simply Q, and represents an efficiency of the capacitor in terms of energy losses.

In some implementations, parallel-plate capacitor 102 is formed between a base electrode and a counter electrode (not shown in FIG. 1). In some implementations, dielectric 110 is formed by oxidizing a superconducting metal such as niobium or aluminum. In some implementations, dielectric 110, for example, an oxide such as $Nb_2O_5$, is deposited using atomic layer deposition. In some implementations, dielectric 110 has a high relative permittivity, for example a relative permittivity greater than 10. $Nb_2O_5$, for example, has a relative permittivity of about 50. The relative permittivity of a material is the permittivity expressed as a ratio relative to the vacuum permittivity. In some implementations, an annealing process is used to increase a quality of the oxide.

A patterned metal layer 112 overlies parallel-plate capacitor 102 and an inter-layer dielectric 114. Metal layer 112 may be a superconducting wiring layer. Metal layer 112 may include, or consist of, a superconducting metal, e.g., niobium or aluminum. Inter-layer dielectric 114 may include, or consist of, silicon dioxide.

A portion 112a of metal layer 112 is electrically communicatively coupled to capacitor plate 108 of parallel-plate capacitor 102. A portion 112b of metal layer 116 is electrically communicatively coupled to capacitor plate 106 by a vertical interconnect access (VIA) 116.

Figure 2:
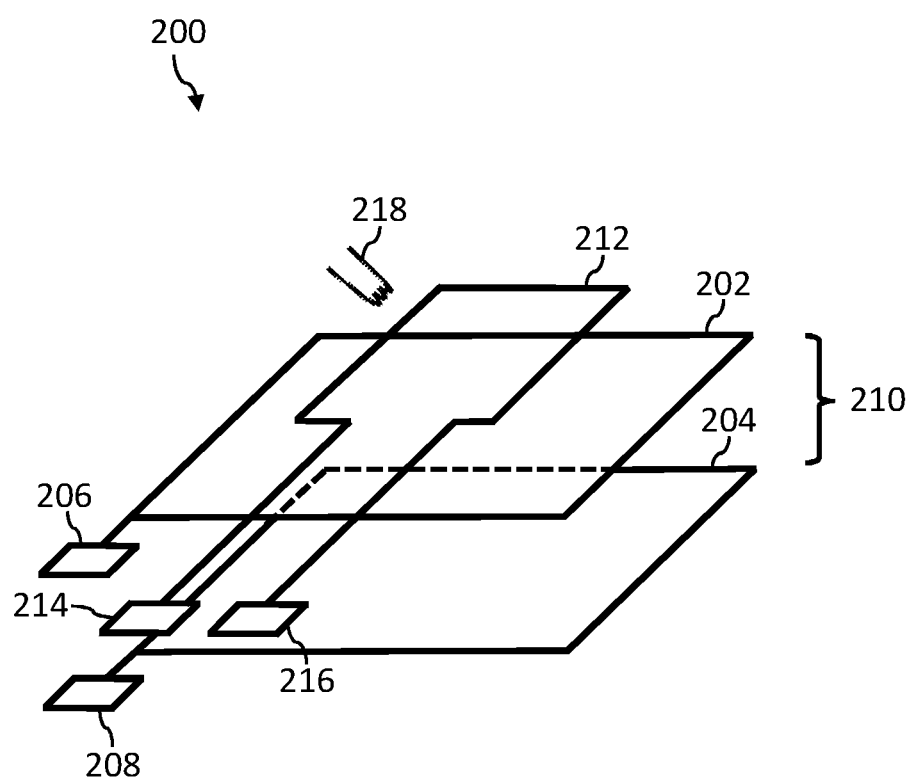
FIG. 2 is a schematic diagram illustrating an example implementation of a flux-tunable parallel-plate capacitor, according to the present disclosure.

FIG. 2 is a schematic diagram illustrating an example implementation of a flux-tunable parallel-plate capacitor 200, according to the present disclosure. Capacitor 200 comprises an upper plate 202 and a lower plate 204. Upper plate 202 overlies lower plate 204. In one implementation, capacitor 200 is fabricated in a multi-layer superconducting integrated circuit, upper plate 202 is formed in one layer, and lower plate 204 is formed in another layer. In some implementations, plates 202 and 204 include, or consist of, a superconducting metal, e.g., niobium or aluminum. In some implementations, plates 202 and 204 include, or consist of, a thin layer of superconducting metal.

In one implementation, plates 202 and 204 include, or consist of, a layer of niobium or aluminum having a thickness between 10 nm and 30 nm. In other implementations, plates 202 and 204 include, or consist of, a material having a high penetration depth, for example, titanium nitride (TiN), niobium nitride (NbN), niobium titanium nitride (NbTiN), or tungsten silicide (WSi). Penetration depth is a measure of how far electromagnetic radiation can penetrate into a material, and is defined as a depth at which an intensity of the radiation falls to 1/e of the intensity of the radiation just beneath the surface of the material. A material having a high penetration depth typically has a penetration depth greater than 100 nm. In some implementations, plates 202 and 204 include, or consist of, a layer of superconducting material having a thickness less than the penetration depth of the material.

Some materials with high penetration depth are materials with a high kinetic inductance. Kinetic inductance can provide an equivalent series inductance. A degree of kinetic inductance of a material can be expressed as:

$$\alpha = L_K/(L_K + L_G)$$

where $L_K$ is kinetic inductance and $L_G$ is geometric inductance. For a non-superconducting inductor $\alpha = 0$. A material with high inductance is typically a material for which $\alpha$ is greater than 0.2. A target value for $\alpha$ of a kinetic inductor can be 0.8.

Kinetic inductance can be observed in high carrier mobility conductors (e.g. superconductors) and at very high frequencies. In some implementations, plates 202 and 204 include, or consist of, a layer of material having a high kinetic inductance.

Upper and lower plates 202 and 204 are electrically communicatively coupled to contact areas 206 and 208, respectively.

Capacitor 200 further includes a layer of dielectric material (not shown in FIG. 2) in region 210 between upper and lower plates 202 and 204. In some implementations, the layer of dielectric material includes, or consists of, a low-loss dielectric. A low-loss dielectric is a material having a complex-valued relative permittivity $\varepsilon_r = \varepsilon_r' - i\varepsilon_r''$ where $\varepsilon_r''/\varepsilon_r' \ll 1$. In some implementations, a low-loss dielectric is a material where $\varepsilon_r''/\varepsilon_r' < 0.1$. The dielectric loss can depend on a frequency of an applied electric field. In some implementations, the low-loss dielectric includes, or consists of, amorphous silicon, crystalline silicon, silicon dioxide, silicon nitride, or amorphous silicon hydride.

Capacitor 200 further comprises a loop 212. Loop 212 may be a superconducting loop. Loop 212 may include, or consist of, a superconducting metal, e.g., niobium or aluminum. Loop 212 is electrically communicatively coupled to contact areas 214 and 216. Loop 212 overlies upper plate 202.

In some implementations, upper and lower plates 202 and 204 can be driven by an AC current (alternating current). Application of a magnetic field in a direction perpendicular to plates 202 and 204 can cause moving charges to be distributed asymmetrically by a Lorentz force at least approximately proportional to a speed of the moving charges. The effect of the Lorentz force can be to reduce an effective area of at least one of plates 202 and 204.

In some implementations, the magnetic field can be provided by a superconducting loop with multiple magnetic flux quanta threading the loop, e.g., superconducting loop 212 of FIG. 2. In other implementations, the magnetic field can be provided using a current-driven coil. In yet other implementations, the magnetic field can be provided by a wire in proximity to the capacitor, for example, by a wire in the same fabrication layer as one of plates 202 and 204.

An advantage of using a superconducting loop (e.g., loop 212) to provide the magnetic field can be that the loop only allows multiples of a flux quantum to thread the loop, thereby providing a discrete tunability of the parallel-plate capacitor. Magnetic flux can be introduced into the superconducting loop by applying a flux bias to the superconducting loop until a screening current for diamagnetic repulsion of the magnetic field starts to exceed a critical current of the superconducting material in the loop, or in a weak link in the superconducting loop (e.g., a Josephson junction interrupting the superconducting loop).

In some implementations, a flux bus is applied to the superconducting loop by an optional inductive interface 218. The inductance interface 218 may be an output coil of a flux storage device on a chip. The inductance interface 218 may be driven to tune (e.g., decrease) a capacitance of a parallel-plate capacitor. The tuning may cause the capacitance to change in discrete increments. Control of one or more flux storage devices may cause one or more parallel-plate capacitors to be addressed individually, or in groups.

In some implementations, an external magnetic field may be applied by a superconducting or a normal (non-superconducting) wire, coil, or loop in proximity to the superconducting integrated circuit.

In operation, plates 202 and 204 are electrically communicatively coupled between two devices (not shown in FIG. 2), and a DC current is applied to loop 212, where the value of the DC current is selected to cause a desired adjustment to the capacitance of capacitor 200.

Figure 3:
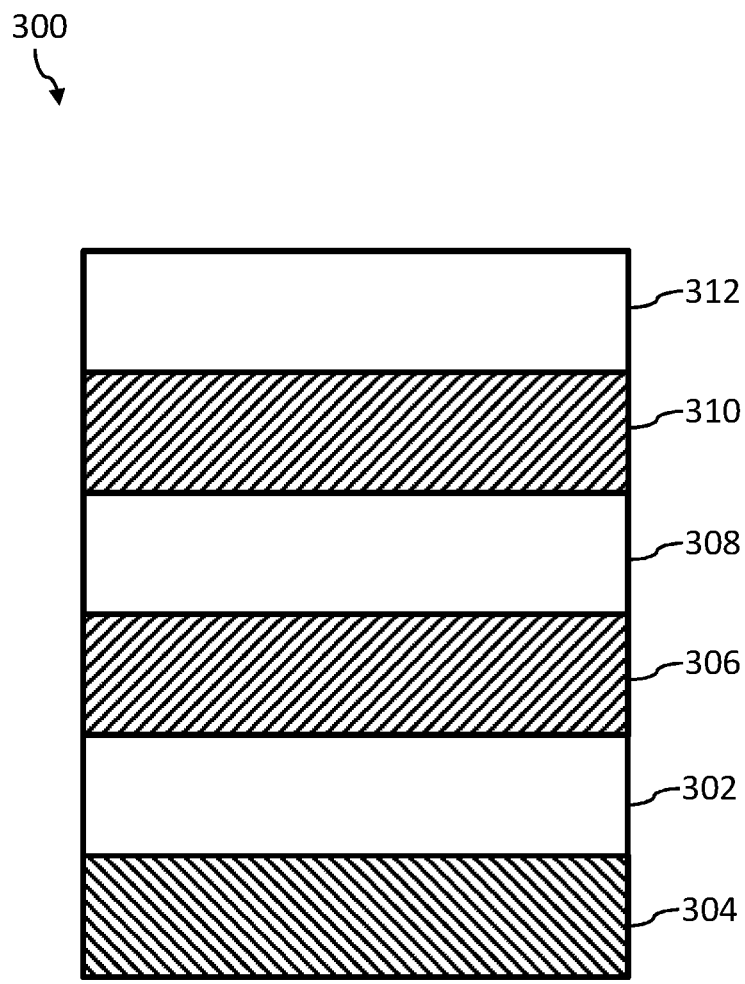
FIG. 3 is a cross-sectional diagram illustrating an example implementation of a fabrication stack of the flux-tunable parallel-plate capacitor of FIG. 2, according to the present disclosure.

FIG. 3 is a cross-sectional diagram illustrating an example implementation of a fabrication stack 300 of flux-tunable parallel-plate capacitor 200 of FIG. 2. Fabrication stack 300 comprises a lower plate layer 302 overlying a substrate 304. In some implementations, substrate 304 includes, or consists of, silicon. In some implementations, substrate 304 includes, or consists of, a dielectric, e.g., silicon dioxide.

Fabrication stack 300 further comprises a separator 306 overlying metal layer 302. Separator 306 may be an insulating layer. Separator 306 may include, or consist of, a layer of dielectric material. The layer of dielectric material of separator 306 may be a planar layer. The layer of dielectric material may be planarized after being deposited to overlie metal layer 302. The layer of dielectric may be a thin film. In one implementation, the thickness of the layer of dielectric is about 50 nm. As described above with reference to FIG. 2, in some implementations, the layer of dielectric material includes, or consists of, a low-loss dielectric. In some implementations, the low-loss dielectric includes, or consists of, amorphous silicon, crystalline silicon, silicon dioxide, silicon nitride, or amorphous silicon hydride.

Stack 300 further comprises an upper plate layer 308 overlying dielectric layer 306. In some implementations, layers 302 and 308 include, or consist of, a superconducting metal, e.g., niobium or aluminum. In other implementations, layers 302 and 308 include, or consist of, titanium nitride (TiN), niobium nitride (NbN), niobium titanium nitride (NbTiN), or tungsten silicide (WSi). Layers 302 and 308 may be patterned layers. Layers 302 and 308 may be patterned by photolithography, for example.

Stack 300 further comprises a dielectric layer 310 overlying metal layer 308. Dielectric layer 310 may be deposited on metal layer 308. Dielectric layer 310 may include, or consist of, the same low-loss dielectric as separator 306.

Stack 300 further comprises a metal layer 312 overlying dielectric layer 310. Metal layer 312 is a superconducting metal layer, and may include, or consist of, niobium or aluminum, for example. Metal layer 312 may be patterned metal layer to form a superconducting loop, e.g., superconducting loop 212 of FIG. 2.

Electric Field-Tunable Parallel-Plate Capacitor

Figure 4A:
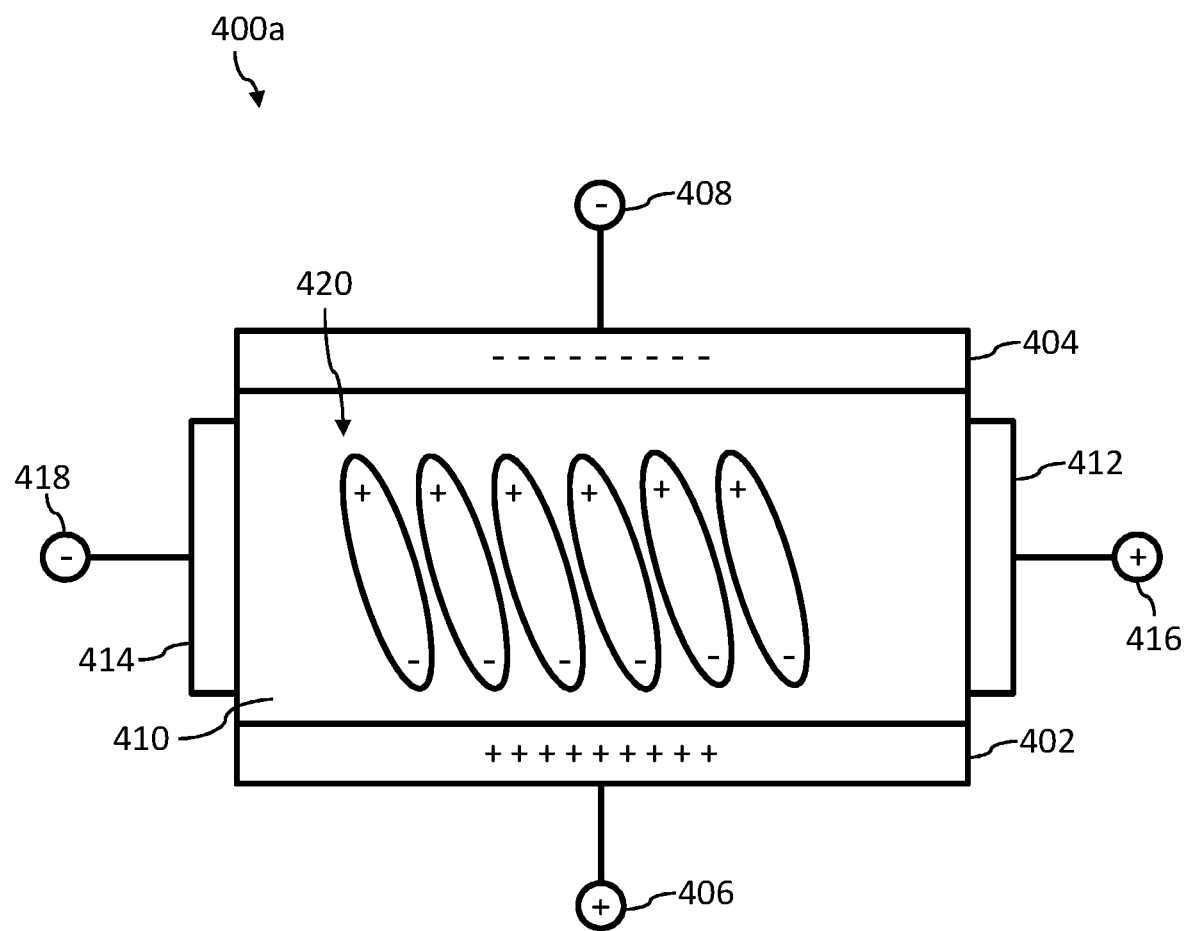
FIG. 4A is a schematic diagram illustrating an example implementation of an electric field-tunable parallel-plate capacitor, according to the present disclosure.

FIG. 4A is a schematic diagram illustrating an example implementation of an electric field-tunable parallel-plate capacitor 400a, according to the present disclosure. Capacitor 400a includes a pair of parallel plates 402 and 404. Plate 402 is an anode, and is electrically communicatively coupled to a positive terminal 406. Plate 404 is a cathode, and is electrically communicatively coupled to a negative terminal 408. Capacitor 400a further includes a dielectric 410 interposed between plates 402 and 404.

Capacitor 400a further includes a pair of bias electrodes 412 and 414. Electrode 412 is electrically communicatively coupled to a positive terminal 416. Electrode 414 is electrically communicatively coupled to a negative terminal 418.

An electric field applied across dielectric 410 in the plane of plates 402 and 404 using bias electrodes 412 and 414 can change a polarization of dielectric 410. Polarization of dielectric 410 is indicated by dipoles 420 in dielectric 410. The applied electric field can rotate dipoles 420, and cause an effective electric susceptibility of dielectric 410 (as seen by plates 402 and 404) to change. The applied electric field can cause a capacitance of capacitor 400a to decrease until dielectric 410 is saturated, and each dipole of dipoles 420 is aligned in a direction parallel to the applied electric field. The decrease in capacitance of capacitor 400a can be monotonic. Saturation may cause an increase in Q of the capacitor. The applied electric field can provide a DC (direct current) bias.

In some implementations, the applied electric field can provide an AC (alternating current) bias instead of, or in addition to, the DC bias. The AC bias can cause a reduction in a loss tangent of dielectric 410, which is, at least in part, due to a saturation of two-level or multi-level systems in the material of dielectric 410. The loss tangent can be a measure of a dielectric material's inherent dissipation of electromagnetic energy (for example, as heat).

In some implementations, an interdigital capacitor is sandwiched between plates of a parallel-plate capacitor, and a dielectric is interposed between the extending electrodes (or "fingers") of the interdigital capacitor. In some implementations, the plates of the parallel-plate capacitor are used as capacitor plates while the interdigital capacitor is used to store charge for applying an orthogonal electric field to polarize the dielectric. In other implementations, the plates of the interdigital capacitor are used as capacitor plates while the parallel-plate capacitor (the plates of which sandwich the interdigital capacitor) is used to apply an electric field to polarize the dielectric.

Figure 4B:
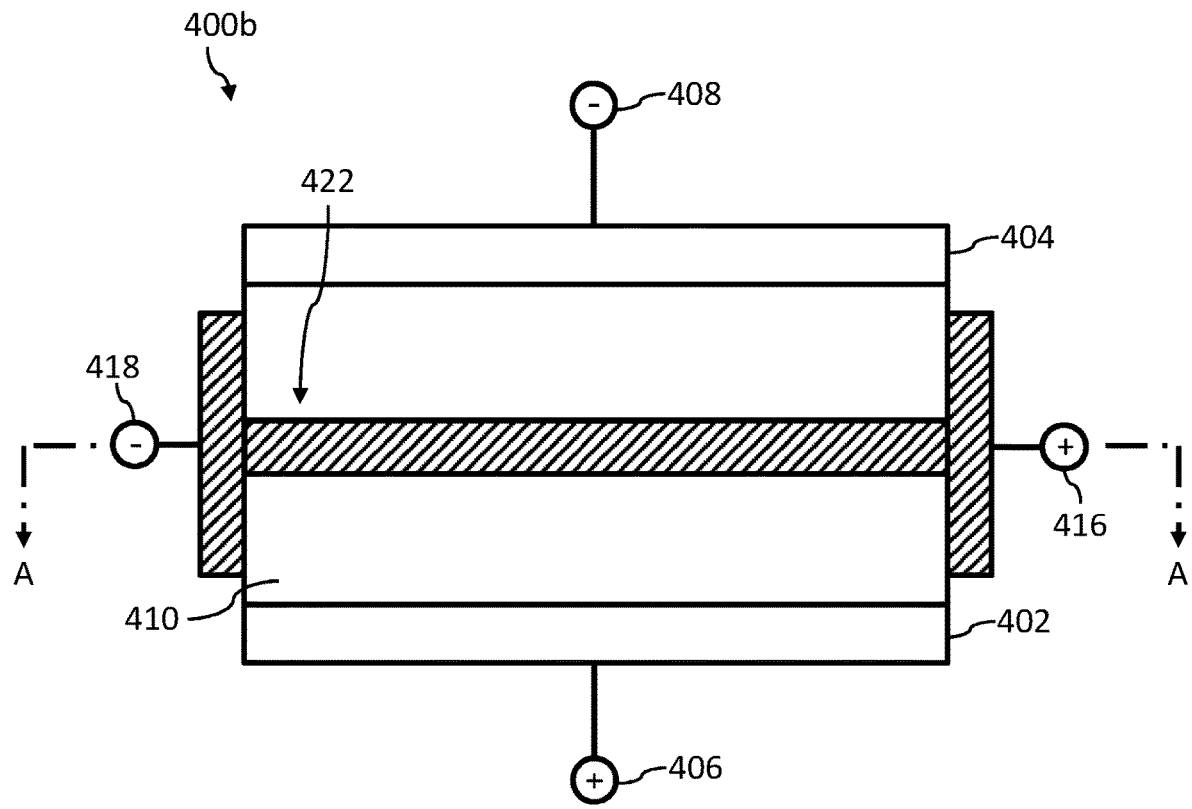
FIG. 4B is a schematic diagram of illustrating another example implementation of an electric field-tunable parallel-plate capacitor, according to the present disclosure.

FIG. 4B is a schematic diagram illustrating another example implementation of an electric field-tunable parallel-plate capacitor 400b, according to the present disclosure. Capacitor 400b includes plates 402 and 404, terminals 406 and 408, and dielectric 410. Capacitor 400b further includes an interdigitated capacitor 422 electrically communicatively coupled to terminals 416 and 418.

Figure 4C:
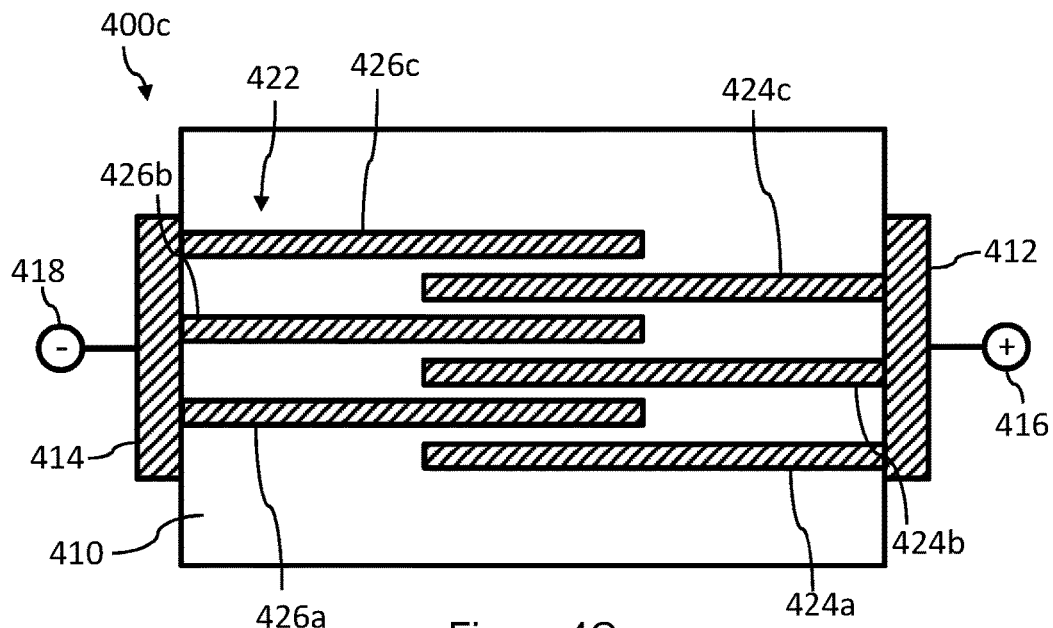
FIG. 4C is a cross-sectional view of the electric field-tunable parallel-plate capacitor of FIG. 4B, according to the present disclosure.

FIG. 4C is a cross-sectional view of electric field-tunable parallel-plate capacitor 400b of FIG. 4B, according to the present disclosure. The plan view of FIG. 4C is in the view direction indicated by arrows A-A. Interdigitated capacitor includes fingers 424a, 424b, and 424c electrically communicatively coupled to bias electrode 412, and fingers 426a, 426b, and 426c electrically communicatively coupled to bias electrode 414.

In some implementations, a DC bias is applied to the plates of the parallel-plate capacitor in addition to an AC signal. The AC signal may, for example, be at microwave frequencies. The DC bias may be used to tune a capacitance of the capacitor. The DC bias applied to the plates may be in addition to, or instead of, a DC bias applied to the transverse electrodes.

Figure 5:
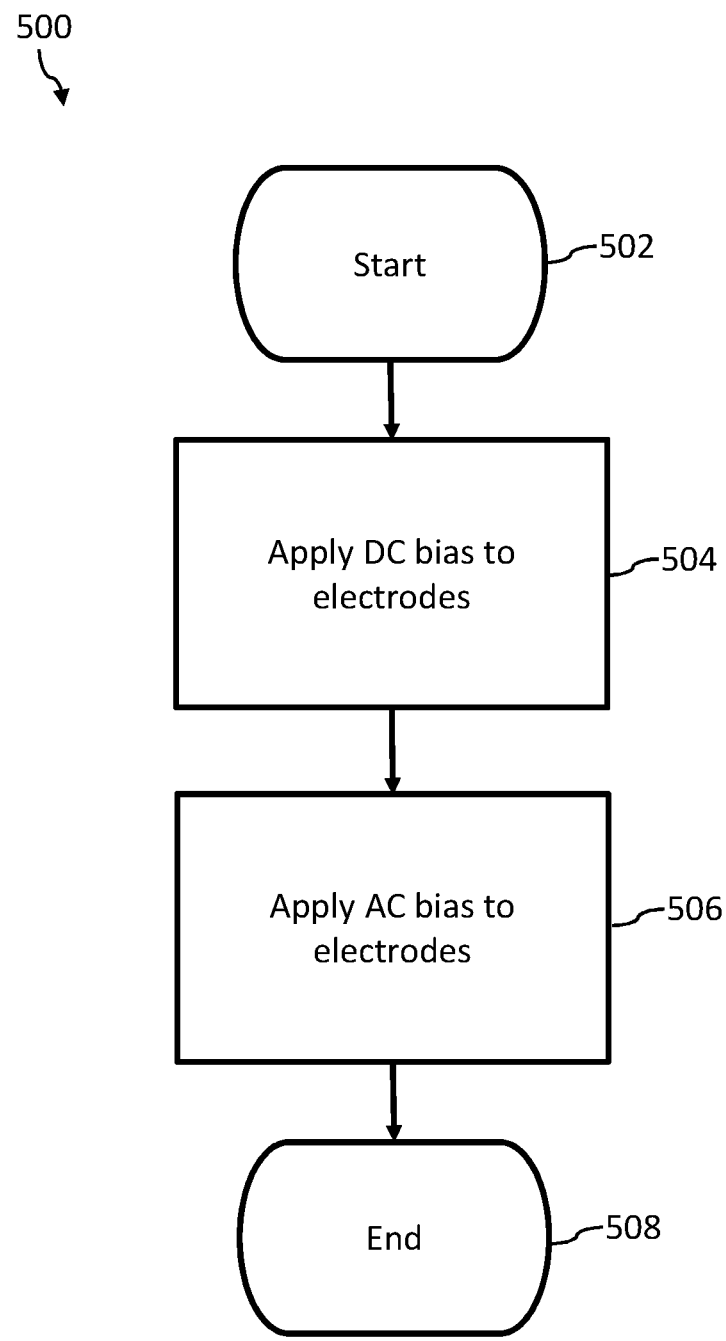
FIG. 5 is a flow chart of a method of operation of the electric field-tunable parallel-plate capacitor of FIG. 4, according to the present disclosure.

FIG. 5 is a flow chart of a method of operation 500 of the electric field-tunable parallel-plate capacitor 400 of FIG. 4, according to the present disclosure. Method 500 includes acts 502-508, though those skilled in the art will appreciate that in alternative implementations certain acts may be omitted and/or additional acts may be added. Those skilled in the art will appreciate that the order of the acts is shown for exemplary purposes only and may change in alternative implementations.

At 502, the method starts. Method 500 may be implemented by a coupler control system (for example, coupler control system 940 of FIG. 9). At 504, the coupler control system applies a DC voltage bias to a pair of bias electrodes (for example, bias electrodes 412 and 414 of FIG. 4) to tune a capacitance of a parallel-plate capacitor (for example, capacitor 400a of FIG. 4A) to a desired value. Tuning the capacitance may include reducing the capacitance.

At 506, the coupler control system applies an AC bias to the bias electrodes to saturate any two-level or multi-level systems in the dielectric of the parallel-plate capacitor (for example, dielectric 410 of FIG. 4A). Applying the AC bias may improve a loss tangent of the dielectric.

Tunable Parallel-Plate Capacitor in a Superconducting Quantum Processor with a Non-Stoquastic Hamiltonian In the implementation of a flux-tunable parallel-plate capacitor described above with reference to FIGS. 1 to 3, a variable magnetic field may be applied to tune the capacitor. In the implementation of an electric field-tunable parallel-plate capacitor described above with reference to FIGS. 4A, 4B, 4C, and 5, an electric field may be applied to tune the capacitor by polarizing a dielectric interposed between the plates of the capacitor, the polarizing generally being in a direction perpendicular to an electric field generated by the plates.

The technology described in the present application may be used to create a tunable parallel-plate capacitor suitable for integration in a fabrication stack of a superconducting integrated circuit. The superconducting integrated circuit may include a superconducting quantum processor, or a portion of a superconducting quantum processor. The tunable parallel-plate capacitor may be used to implement a non-stoquastic Hamiltonian on the superconducting quantum processor.

A Hamiltonian is referred to in the present application as a "stoquastic" Hamiltonian if it is given by a real Hermitian matrix in which all off-diagonal elements of the matrix are non-positive in the standard basis. Otherwise, the Hamiltonian is referred to as a "non-stoquastic" Hamiltonian. Hormozi et. al. in "NONSTOQUASTIC HAMILTONIANS AND QUANTUM ANNEALING OF AN ISING SPIN GLASS" (arxiv.org/pdf/1609.06558, May 2017) describe the role of Hamiltonian complexity in the performance of a quantum annealer.

A characteristic of a system with a non-stoquastic Hamiltonian is that the system can exhibit destructive interference between tunneling paths that cannot be efficiently simulated by a stochastic method. Interference can occur when two waves meet. Destructive interference can occur when one wave has a displacement in an opposite direction to the other wave. Destructive interference between tunneling paths can result in a lower tunneling amplitude.

While there is evidence that a non-stoquastic Hamiltonian can improve the efficiency of quantum annealing, a Quantum Monte-Carlo (QMC) method (regarded as one of the more advanced classical simulation methods) is generally unable to efficiently simulate a quantum system with a non-stoquastic Hamiltonian.

A non-stoquastic Hamiltonian may enhance multi-qubit tunneling during quantum annealing, which may be useful for simulating Fermionic systems or in general quantum tunneling problems with tunneling amplitudes of different signs using quantum annealing via a quantum processor.

In a quantum processor that includes flux qubits (also referred to in the present application as superconducting flux qubits), magnetic coupling can provide stoquastic coupling terms in the Hamiltonian. A non-stoquastic Hamiltonian can be engineered by coupling qubits using another degree of freedom, for example by coupling qubits using a charge, or electrostatic, degree of freedom. In one implementation, qubits can be coupled using a charge degree of freedom by providing capacitive coupling between qubits (see, for example, U.S. Pat. No. 7,253,654 "SUPERCONDUCTING QUBITS HAVING A PLURALITY OF CAPACITIVE COUPLINGS"). U.S. Pat. No. 7,613,765 entitled "BUS ARCHITECTURE FOR QUANTUM PROCESSING" describes controllable coupling of a qubit to a superconducting bus, including a state in which the qubit is capacitively coupled to the bus. Tunable capacitive coupling can be used to couple information between superconducting qubits (see, for example, Averin et al. Physical Review Letters 91, 05003 [2003]). Approaches to communications between qubits to provide an architecture for universal adiabatic quantum computation are described in U.S. Pat. No. 8,234,103 entitled "PHYSICAL REALIZATIONS OF A UNIVERSAL ADIABATIC QUANTUM COMPUTER". A quantum processor with communicative coupling between pairs of qubits via an in-situ tunable superconducting capacitive coupler and an in-situ tunable superconducting inductive coupler is described in U.S. Patent Application US20150111754 entitled "UNIVERSAL ADIABATIC QUANTUM COMPUTING WITH SUPERCONDUCTING QUBITS".

Figure 6:
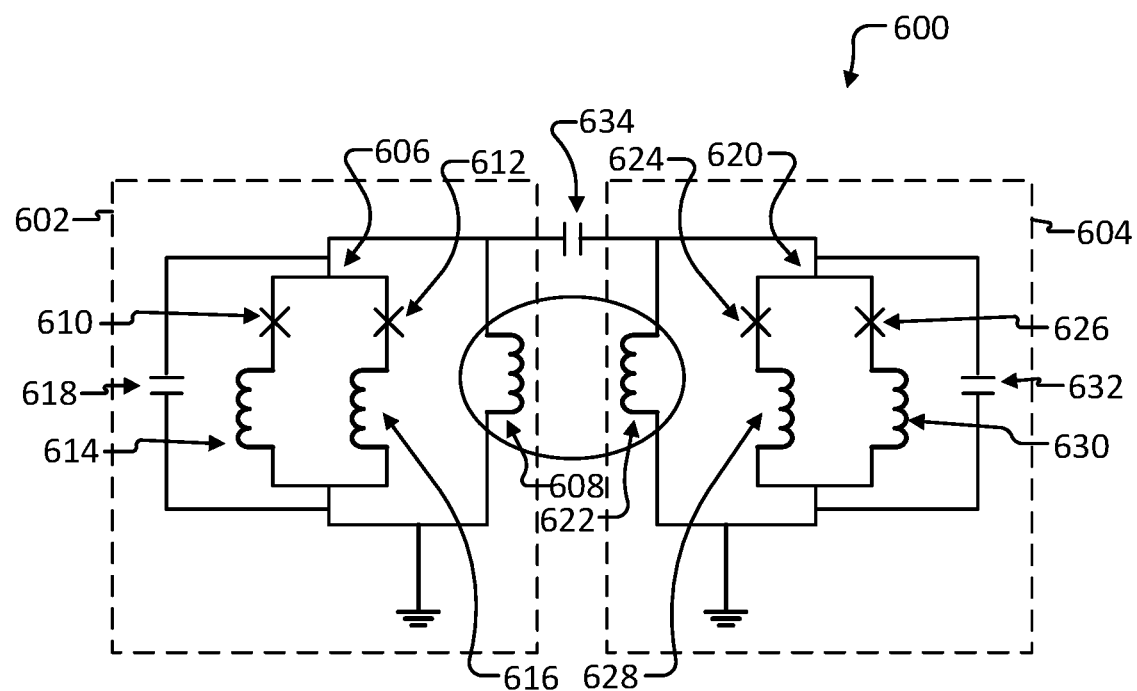
FIG. 6 is a schematic diagram of an example implementation of a non-stoquastic Hamiltonian via capacitive coupling, according to the present disclosure.

FIG. 6 is a schematic diagram illustrating an example implementation of a portion 600 of a superconducting quantum processor, according to the present disclosure. Portion 600 includes an example implementation of a non-stoquastic Hamiltonian via capacitive coupling.

Portion 600 of the superconducting quantum processor comprises qubits 602 and 604 (each indicated via respective broken line rectangles enclosing the qubits 602 and 604). In one implementation, qubit 602 and/or qubit 604 is a superconducting flux qubit. In another implementation, qubits 602 and 604 are charge qubits or hybrid charge-phase qubits or another suitable type of qubits.

Qubit 602 comprises a compound Josephson junction (CJJ) 606 and an inductance 608. CJJ 606 comprises Josephson junctions 610 and 612, inductances 614 and 616, and a capacitance 618. In some implementations, capacitance 618 is an intrinsic capacitance of CJJ 606.

Qubit 604 comprises a compound Josephson junction (CJJ) 620 and an inductance 622. CJJ 620 comprises Josephson junctions 624 and 626, inductances 628 and 630, and a capacitance 632. In some implementations, capacitance 632 is an intrinsic capacitance of CJJ 620.

Qubits 402 and 404 can be magnetically (inductively) communicatively coupled via a mutual inductance from proximity of inductance 608 of qubit 602 and inductance 622 of qubit 604. In one implementation, inductive communicative coupling of qubits 602 and 604 can be performed using a coupling device such as tunable coupler 704 of FIG. 7. In one implementation, the inductive communicative coupling of qubits 602 and 604 is tunable, and the coupling strength can be tuned, for example via an interface (not shown in FIG. 6).

Portion 600 of the superconducting quantum processor comprises a coupling capacitance 634. Qubits 602 and 604 can be capacitively communicatively coupled via coupling capacitance 634.

In one implementation, coupling capacitance 634 of FIG. 6 has a value of approximately 400 F which can be much larger than a total single-qubit capacitance of either qubit 602 or qubit 604. For example, the total capacitance of qubit 602 can be determined at least in part from a value of capacitance 618, and the total capacitance of qubit 604 can be determined at least in part from a value of capacitance 632. When coupling capacitance 634 is much larger than the total single-qubit capacitance of either qubit 602 or qubit 604, the loaded capacitance approaches a value of twice the single-qubit total capacitance. In this regime, the coupling energy $J_y$ may not have a strong dependence on the total single-qubit capacitance.

A description of stoquastic and non-stoquastic Hamiltonians, and expressions for effective tunneling amplitudes can be found in PCT Patent Application No. US2018/066613 (published as International patent application publication WO2019126396A1), SYSTEMS AND METHODS FOR COUPLING QUBITS IN A QUANTUM PROCESSOR, filed Dec. 19, 2018.

A superconducting flux qubit can be electrostatically communicatively coupled to another superconducting flux qubit. In one implementation, coupling can be introduced by attaching coupling capacitors across the compound Josephson junctions of the qubits.

Figure 7:
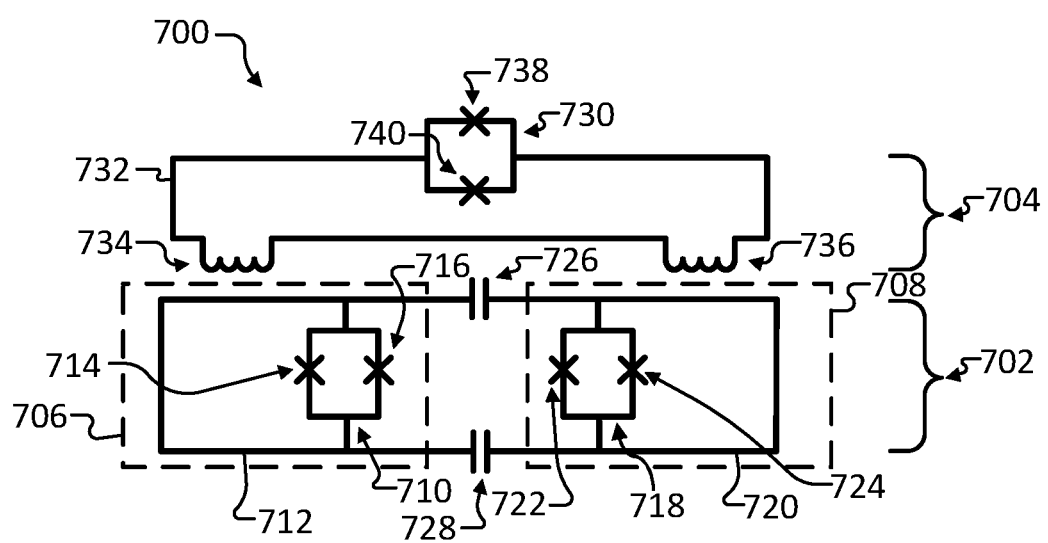
FIG. 7 is a schematic diagram illustrating an example implementation of a portion of a superconducting circuit that includes qubits with electrostatic communicative coupling, according to the present disclosure.

FIG. 7 is a schematic diagram illustrating an example implementation of a portion 700 of a superconducting circuit that includes qubits with electrostatic communicative coupling, according to the present disclosure. Portion 700 of the superconducting circuit comprises a circuit element 702 comprising a pair of capacitively communicatively coupled qubits, and a tunable coupler 704.

Circuit element 702 comprises pair of qubits 706 and 708 (illustrated enclosed in respective broken line rectangles). Qubit 706 comprises a compound Josephson junction (CJJ) 710 and a qubit loop 712 made from material that is superconductive in a range of temperatures, typically in a range of temperatures below a critical temperature characteristic of the material (also referred to in the present application as superconductive material). CJJ 710 comprises a pair of Josephson junctions 714 and 716 in parallel with one another. Qubit 708 comprises a compound Josephson junction (CJJ) 718 and a qubit loop 720 made from superconductive material. CJJ 718 comprises a pair of Josephson junctions 722 and 724 in parallel with one another. Qubits 706 and 708 are capacitively communicatively coupled to one another by capacitances 726 and 728.

Tunable coupler 704 comprises a CJJ 730, a coupler loop 732 made from superconductive material, and inductances 734 and 736. CJJ 730 comprises a pair of Josephson junctions 738 and 740 in parallel with one another. Tunable coupler 704 can be tuned via the threading of coupler loop 732 by flux created by electrical current flowing through a magnetic flux inductor (not shown in FIG. 7). Tunable coupler 704 is also referred to in the present application as a controllable coupler, and can be controlled by tuning as described above.

Single SQUID Superconducting Resonator

Figure 8:
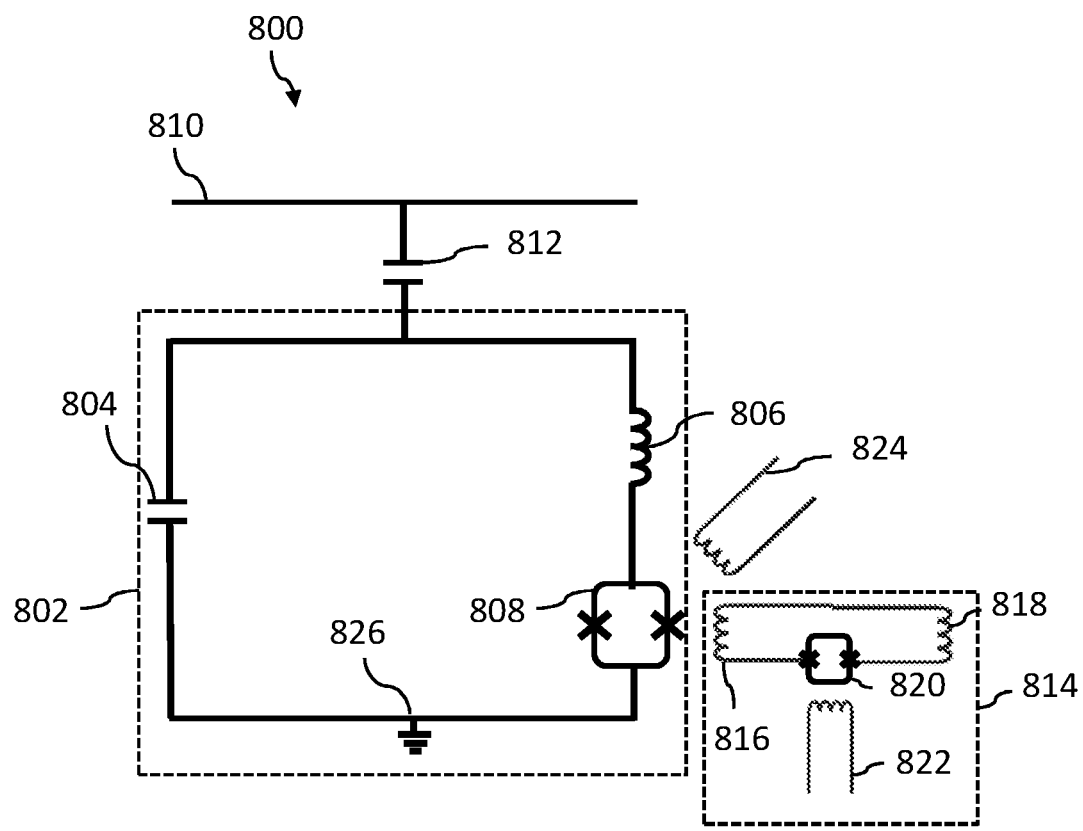
FIG. 8 is a schematic drawing of an example implementation of a superconducting circuit comprising a superconducting resonator, according to the present disclosure.

FIG. 8 is a schematic drawing of an example implementation of a superconducting circuit 800 comprising a superconducting resonator 802 (illustrated enclosed in broken line rectangle) according to the present disclosure. Superconducting resonator 802 comprises a capacitance 804, and an inductance 806, which may or may not take the form of discrete capacitors and inductors, respectively. A superconducting resonator (for example, superconducting resonator 802 of FIG. 8) may be an element of readout system of a superconducting quantum processor. See, e.g., readout control system 936 and quantum processor 934 of FIG. 9.

Superconducting resonator 802 further comprises a single SQUID loop 808. SQUID loop 808 is a DC SQUID and comprises a pair of Josephson junctions in parallel with one another in a superconducting loop. SQUID loop 808 enables tuning of the resonance frequency of superconducting resonator 802 by adjusting the SQUID flux bias as explained below.

The resonance frequency co of superconducting resonator 802 can be determined by the following formula for an LC circuit:

$$\omega = \frac{1}{\sqrt{(LC)}}$$

where C is the value of capacitance 804 and L is the sum of the geometric inductance 806 and the parallel sum of the Josephson inductances from the two Josephson junctions in SQUID loop 808.

Small fluctuations in capacitance C and/or inductance L result in a fractional frequency perturbation of the resonance frequency as follows:

$$\frac{\delta\omega}{\omega} = \frac{-\delta C}{2C} + \frac{-\delta L}{2L}$$

In one implementation, superconducting resonator 802 is a distributed resonator. A distributed resonator has capacitance and inductance that cannot be isolated into separate lumped element capacitors and inductors. An advantage of a distributed resonator is that it can be designed to be insensitive to layer thickness. A distributed resonator can also be more tolerant to variations in fabrication. A distributed resonator can exhibit harmonics at every octave which can be a disadvantage in an implementation using more than one octave of bandwidth.

In other implementations, superconducting resonator 802 is a lumped element design. A lumped element design can advantageously provide a bandwidth greater than one octave, and can reduce or minimize the extent of the resonator's electric field. Since the loss tangent of superconducting resonator 802 can depend on the volume of lossy dielectric exposed to the resonator's electric field, it can be beneficial to use a lumped element design.

In a lumped element design, capacitance 804 can be implemented using one or more capacitors. The capacitors can be interdigitated capacitors and/or parallel plate capacitors. In one implementation, capacitance 804 is implemented using a parallel plate capacitor. In one example, the capacitance of the parallel plate capacitor is approximately 2 pF.

In some implementations, capacitance 804 is a tunable capacitor, for example, one of the tunable parallel-plate capacitors described above.

Circuit 800 further comprises a transmission line 810, a coupling capacitance 812 (e.g., a discrete capacitor), and a last or final shift register stage 814 (illustrated enclosed in broken line rectangle). Last shift register stage 814 comprises inductances 816 and 818, SQUID loop 820 and interface 822. Last or final shift register stage 814 may, for example, take the form of a Quantum Flux Parametron (QFP). Last or final shift register stage 814 is the endpoint of a shift register comprising one or more stages. Last or final shift register stage 814 is a stage that can be communicatively coupled to superconducting resonator 802 for the purposes of reading out the state of a superconducting device. In one implementation, superconducting resonator 802 is fed by a flux shift register which, in turn, is fed by a flux qubit.

Interface 824 can provide a flux bias to SQUID loop 808 and can be controlled by a flux DAC (not shown in FIG. 8) or by an analog line. A flux DAC is an example of an on-chip control circuitry. Further examples can be found in U.S. Pat. Nos. 7,876,248; 7,843,209; 8,018,244; 8,098,179; 8,169,231; and 8,786,476.

Superconducting resonator 802 is connected at node 826 to ground.

Hybrid Computer

Figure 9:
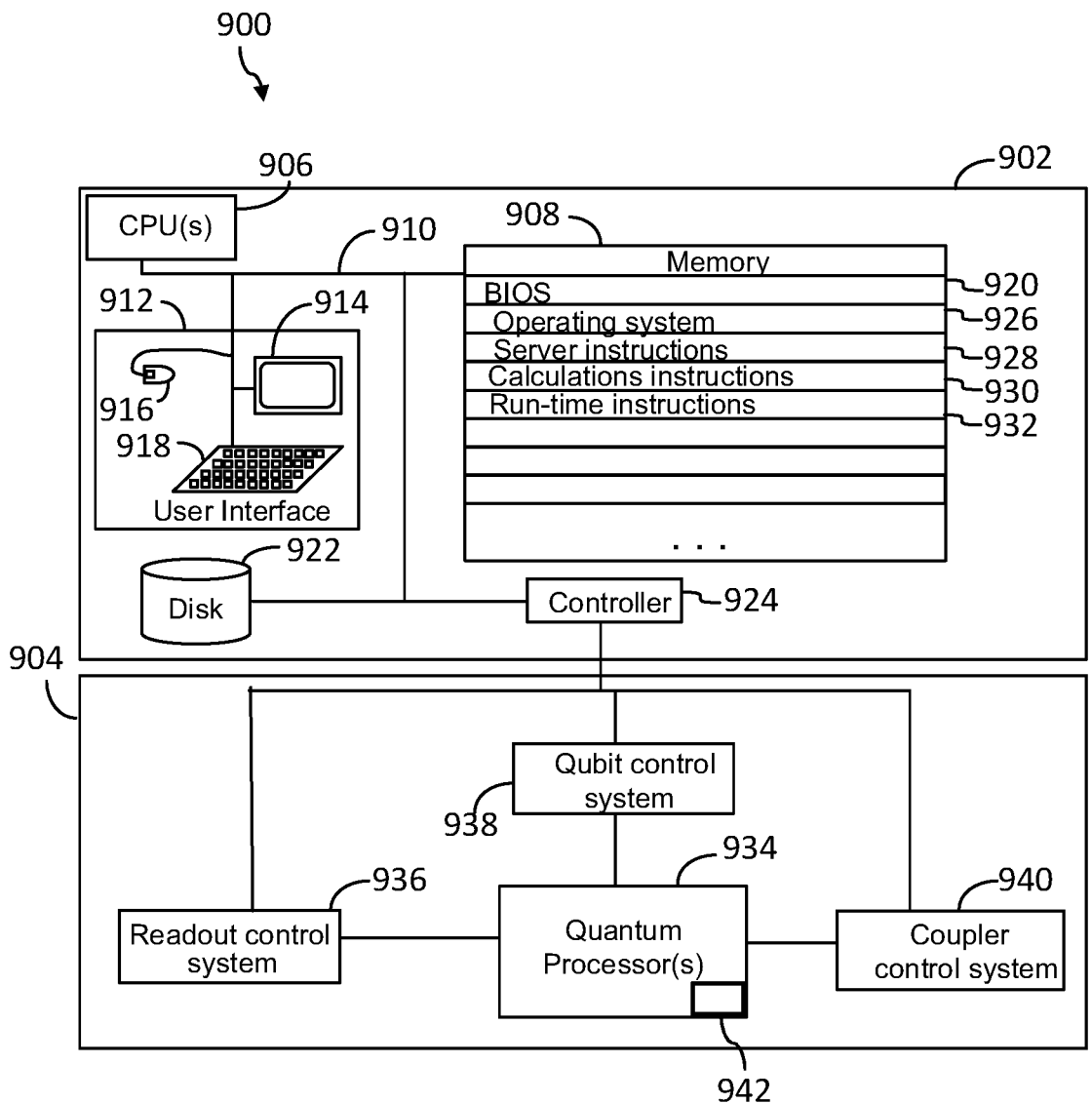
FIG. 9 is a block diagram of a hybrid computer comprising a non-stoquastic processor having tunable capacitive coupling, according to the present disclosure.

FIG. 9 is a block diagram of a hybrid computing system 900 comprising a non-stoquastic processor having tunable capacitive coupling, according to the present disclosure. Hybrid computing system 900 includes a digital computer 902 coupled to an analog computer 904. In some implementations, analog computer 904 is a quantum computer and digital computer 902 is a classical computer.

The exemplary digital computer 902 includes a digital processor (such as one or more central processor units 906) that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 902 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer-readable and/or processor-readable instructions (sometimes known as program modules), application programs and/or data, may be stored in local and/or remote memory storage devices (e.g., non-transitory computer-readable and/or processor-readable media).

Digital computer 902 may include at least one or more digital processors (e.g., one or more central processor units 906), one or more system memories 908, and one or more system buses 910 that couple various system components, including system memory 908 to central processor unit 906.

The digital processor may be any logic processing unit, such as one or more central processing units ("CPUs") with one or more cores, graphics processing units ("GPUs"), digital signal processors ("DSPs"), application-specific integrated circuits ("ASICs"), field-programmable gate arrays ("FPGAs"), programmable logic controllers (PLCs), etc.

Digital computer 902 may include a user input/output subsystem 912. In some implementations, the user input/output subsystem includes one or more user input/output components such as a display 914, mouse 916, and/or keyboard 918. System bus 910 can employ any known bus structures or architectures, including a memory bus with a memory controller, a peripheral bus, and a local bus. System memory 908 may include non-volatile memory, for example one or more of read-only memory ("ROM"), static random-access memory ("SRAM"), Flash NAND; and volatile memory, for example random access memory ("RAM") (not shown), all of which are examples of non-transitory computer-readable and/or processor-readable media.

A basic input/output system ("BIOS") 920, which can form part of the ROM, contains basic routines that help transfer information between elements within digital computer 902, such as during startup.

Digital computer 902 may also include other non-volatile memory 922. Non-volatile memory 922 may take a variety of forms, including: a hard disk drive for reading from and writing to a hard disk, an optical disk drive for reading from and writing to removable optical disks, and/or a magnetic disk drive for reading from and writing to magnetic disks, all of which are examples of non-transitory computer- or processor-readable media. The optical disk can be a CD-ROM or DVD, while the magnetic disk can be a magnetic floppy disk or diskette. Non-volatile memory 922 may communicate with digital processor via system bus 910 and may include appropriate interfaces or controllers 924 coupled to system bus 910. Non-volatile memory 922 may serve as non-transitory long-term storage for computer-readable and/or processor-readable instructions, data structures, or other data (also called program modules) for digital computer 902.

Although digital computer 902 has been described as employing hard disks, optical disks and/or magnetic disks, those skilled in the relevant art will appreciate that other types of non-volatile computer-readable media may be employed, such magnetic cassettes, flash memory cards, Flash, ROMs, smart cards, etc., all of which are further examples of non-transitory computer- or processor-readable media. Those skilled in the relevant art will appreciate that some computer architectures conflate volatile memory and non-volatile memory. For example, data in volatile memory can be cached to non-volatile memory, or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-Line Memory Modules.

Various sets of computer-readable and/or processor-readable instructions (also called program modules), application programs and/or data can be stored in system memory 908.

For example, system memory 908 may store an operating system 926, server instructions 928, calculations instructions 930, and/or run-time instructions 932.

While shown in FIG. 9 as being stored in system memory 908, the program modules and other data can be stored elsewhere including in non-volatile memory 922 or in one or more other non-transitory computer-readable and/or processor-readable media.

Analog computer 904 can be provided in an isolated environment (not shown). For example, where analog computer 904 is a quantum computer, the environment shields the internal elements of the quantum computer from heat, magnetic field, and the like. Analog computer 904 includes one or more analog processors such as quantum processor(s) 934.

A quantum processor includes programmable elements such as qubits, couplers, and other devices. In one implementation, the qubits are superconducting flux qubits. The qubits are read out via readout system 936. These results can be fed to the various sets of computer-readable and/or processor-readable instructions for digital computer 902. Analog computer 904 can include a qubit control system 938 and a coupler control system 940. Coupler control system 940 can provide control of communicative coupling between qubits such as inductive and capacitive communicative coupling described in the present application. Capacitive coupling in quantum processor(s) 934 may be implemented using a tunable parallel-plate capacitor 942, for example one of the tunable capacitors described above.

In some embodiments, hybrid computer 900 is used to implement quantum annealing and/or adiabatic quantum computation using quantum processor 934.

In some implementations, digital computer 902 can operate in a networked environment using logical connections to at least one client computer system. In some implementations, digital computer 902 is coupled via logical connections to at least one database system. These logical connections may be formed using any means of digital communication, for example, through a network, such as a local area network ("LAN") or a wide area network ("WAN") including, for example, the Internet. The networked environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 902 may be connected to the LAN through an adapter or network interface card ("NIC") (communicatively linked to system bus 910). When used in a WAN networked environment, digital computer 902 may include an interface and modem (not shown), or a device such as NIC, for establishing communications over the WAN. Non-networked communications may additionally, or alternatively, be employed.

The various embodiments described above can be combined to provide further embodiments. To the extent that they are not inconsistent with the specific teachings and definitions herein, all of the U.S. patents, U.S. patent application publications, U.S. patent applications, foreign patents, and foreign patent applications referred to in this specification and/or listed in the Application Data Sheet that are assigned to the assignee of this patent application, including but not limited to the following: U.S. Pat. Nos. 7,135,701; 7,418,283; 7,533,068; 7,613,765; 7,619,437; 7,639,035; 7,843,209; 7,876,248; 7,898,282; 8,008,942;

8,018,244; 8,098,179; 8,169,231; 8,190,548; 8,195,596; 8,234,103; 8,283,943; 8,786,476; U.S. Patent Publication No. 2011-0022820; PCT Patent Application No. WO2016US031885 (published as International patent application publication WO2016183213A1), entitled "FREQUENCY MULTIPLEXED RESONATOR INPUT AND/OR OUTPUT FOR A SUPERCONDUCTING DEVICE", filed May 11, 2016; PCT Patent Application No. WO2018016237, entitled "SYSTEMS AND METHODS FOR FABRICATION OF SUPERCONDUCTING INTEGRATED CIRCUITS", filed Jan. 31, 2018; PCT Patent Application No. US2018/066613 (published as International patent application publication WO2019126396A1), entitled "SYSTEMS AND METHODS FOR COUPLING QUBITS IN A QUANTUM PROCESSOR", filed Dec. 19, 2018; U.S. Patent Publication No. US20150111754, entitled "UNIVERSAL ADIABATIC QUANTUM COMPUTING WITH SUPERCONDUCTING QUBITS", filed Oct. 21, 2014; and U.S. Patent Application No. 63/117,851, entitled "SYSTEMS, ARTICLES, AND METHODS FOR A TUNABLE CAPACITOR", filed Nov. 24, 2020 are incorporated herein by reference, in their entireties. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A superconducting integrated circuit comprising:
   a tunable parallel-plate capacitor, the tunable parallel-plate capacitor comprising:
      a first capacitor plate having a plane;
      a second capacitor plate having a plane, the plane of the second capacitor plate geometrically parallel to the plane of the first capacitor plate, wherein the first and second capacitor plate comprise a superconducting material having a high penetration depth; and
      a dielectric interposed between the first capacitor plate and the second capacitor plate; and
   a magnetic field generator operable to apply a magnetic field to the tunable parallel-plate capacitor to tune a capacitance of the tunable parallel-plate capacitor.

2. The superconducting integrated circuit of claim 1, wherein the magnetic field generator comprises a loop of superconducting material overlying the first capacitor plate and the second capacitor plate, a plane of the loop of superconducting material geometrically parallel to the plane of the first capacitor plate and the plane of the second capacitor plate, wherein, in operation, the loop of superconducting material is driven by a current to generate a magnetic field, the magnetic field which tunes a capacitance of the tunable parallel-plate capacitor.

3. The superconducting integrated circuit of claim 2, further comprising an interface which, in operation, applies a flux bias to the loop of superconducting material to cause magnetic flux to be introduced into the loop.

4. The superconducting integrated circuit of claim 1, wherein the superconducting material is a superconducting metal.

5. The superconducting integrated circuit of claim 4, wherein the superconducting metal is at least one of niobium and aluminum.

6. The superconducting integrated circuit of claim 1, wherein the superconducting material having a high penetration depth is one of titanium nitride (TiN), niobium titanium nitride (NbTiN), niobium nitride (NbN), and tungsten silicide (WSi).

7. The superconducting integrated circuit of claim 1, wherein the dielectric includes a layer of low-loss dielectric.

8. The superconducting integrated circuit of claim 7, wherein the low-loss dielectric is at least one of amorphous silicon, crystalline silicon, silicon dioxide, silicon nitride, or amorphous silicon hydride.

9. The superconducting integrated circuit of claim 1, further comprising:
   a base electrode electrically communicatively coupled to the first capacitor plate; and
   a counter electrode electrically communicatively coupled to the second capacitor plate.

10. A superconducting integrated circuit comprising:
    a tunable parallel-plate capacitor, the tunable parallel-plate capacitor comprising:
       a first capacitor plate having a plane;
       a second capacitor plate having a plane, the plane of the second capacitor plate geometrically parallel to the plane of the first capacitor plate, the second capacitor plate spaced apart from the first capacitor plate, wherein the first and second capacitor plate comprise a superconducting material having a high penetration depth; and
       a dielectric interposed between the first capacitor plate and the second capacitor plate; and
    an electric field generator operable to apply an electric field to the tunable parallel-plate capacitor to tune a capacitance of the tunable parallel-plate capacitor.

11. The superconducting integrated circuit of claim 10, wherein the electric field generator comprises:
    a first bias electrode having a plane; and
    a second bias electrode having a plane, the plane of the second bias electrode geometrically parallel to the plane of the first bias electrode, the planes of the first and the second bias electrodes orthogonal to the planes of the first and the second capacitor plates, the first and the second bias electrodes situated between the first and the second capacitor plates, and on either side of the dielectric, wherein, in operation, the first and the second bias electrodes provide a bias current to generate an electric field, the electric field which tunes a capacitance of the tunable parallel-plate capacitor.

12. The superconducting integrated circuit of claim 11, wherein the bias current includes a direct current (DC) bias current.

13. The superconducting integrated circuit of claim 11, wherein the bias current includes an alternating (AC) bias current.

14. The superconducting integrated circuit of claim 10, wherein the electric field generator comprises an interdigitated capacitor interposed between the first and the second capacitor plates.

15. The superconducting integrated circuit of claim 10, wherein the electric field reduces a capacitance of the tunable parallel-plate capacitor.

16. The superconducting integrated circuit of claim 10, wherein the electric field monotonically reduces a capacitance of the tunable parallel-plate capacitor.

17. The superconducting integrated circuit of claim 10, wherein the superconducting material is a superconducting metal selected from a group consisting of: niobium and aluminum.

18. The superconducting integrated circuit of claim 10, wherein the superconducting material having a high penetration depth is one of titanium nitride (TiN), niobium nitride (NbN), niobium titanium nitride (NbTiN), and tungsten silicide (WSi).

19. The superconducting integrated circuit of claim 10, wherein the dielectric includes a layer of low-loss dielectric selected from a group consisting of: amorphous silicon, crystalline silicon, silicon dioxide, silicon nitride, and amorphous silicon hydride.

20. The superconducting integrated circuit of claim 10, further comprising:
- a base electrode electrically communicatively coupled to the first capacitor plate; and
- a counter electrode electrically communicatively coupled to the second capacitor plate.

* * * * *